United States Patent
Kawanishi et al.

(10) Patent No.: US 7,201,850 B2
(45) Date of Patent: Apr. 10, 2007

(54) METHOD FOR PROVIDING SURFACE TEXTURING OF ALUMINUM SHEET, SUBSTRATE FOR LITHOGRAPHIC PLATE AND LITHOGRAPHIC PLATE

(75) Inventors: Naoyuki Kawanishi, Minami-Ashigara (JP); Tadashi Hayashi, Minami-Ashigara (JP); Hirokazu Sawada, Shizuoka (JP); Akio Uesugi, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 11/134,706

(22) Filed: May 23, 2005

(65) Prior Publication Data

US 2005/0258136 A1 Nov. 24, 2005

(30) Foreign Application Priority Data

May 21, 2004 (JP) .............................. 2004-152009

(51) Int. Cl.
*B44C 1/22* (2006.01)
*B23H 5/00* (2006.01)

(52) U.S. Cl. .............................. 216/9; 216/32; 216/83; 219/69.17; 430/270.1; 427/580

(58) Field of Classification Search ................ 216/9, 216/32, 83; 219/69.17; 427/580
See application file for complete search history.

(56) References Cited

U.S. PATENT DOCUMENTS

| | | | |
|---|---|---|---|
| 3,357,912 A | | 12/1967 | Inoue |
| 4,735,678 A | * | 4/1988 | Mandigo et al. ............. 216/20 |
| 4,947,016 A | * | 8/1990 | Puyplat ................... 219/69.17 |
| 5,539,173 A | * | 7/1996 | Takahashi ................ 219/69.14 |
| 2003/0136167 A1 | | 7/2003 | Pont et al. |
| 2005/0118452 A1 | * | 6/2005 | Nishino et al. ............ 428/667 |

FOREIGN PATENT DOCUMENTS

| | | | |
|---|---|---|---|
| EP | 0631837 A1 | * | 1/1995 |
| JP | 60-36196 A | | 2/1985 |
| JP | 60 036196 A | | 2/1985 |
| JP | 62 025094 A | | 2/1987 |
| JP | 62-25094 A | | 2/1987 |
| JP | 62 111792 A | | 5/1987 |
| JP | 62-111792 A | | 5/1987 |
| JP | 62 137111 A | | 6/1987 |
| JP | 62 218189 A | | 9/1987 |

(Continued)

*Primary Examiner*—Shamim Ahmed
(74) *Attorney, Agent, or Firm*—Sughrue Mion, PLLC

(57) ABSTRACT

According to the present invention, since the concavo-convex pattern of the embossing form is formed by electrical discharge machining, the peaks on the surface of the resultant embossing form are all of the same level or height, which enables the enhancement of the service life of the embossing form. Further, since the concavo-convex pattern of the embossing form is formed by electrical discharge machining, even a complicated and minute concavo-convex pattern can be formed. Accordingly, when applying the method of the present invention to, for example, the production of a substrate for a lithographic plate, an aluminum substrate for a lithographic plate which excels in plate wear, sensitivity and resistance to stains can be produced. And when applying the same to the production of an aluminum decorative laminate, an aluminum decorative laminate which excel in glossiness and paint adhesion can be produced.

6 Claims, 8 Drawing Sheets

FOREIGN PATENT DOCUMENTS

| | | |
|---|---|---|
| JP | 62-218189 A | 9/1987 |
| JP | 7-115045 * | 12/1995 |
| JP | 10-99905 A | 4/1998 |
| JP | 10-259499 A | 9/1998 |
| JP | 10-328705 A | 12/1998 |
| JP | 10 328705 A | 12/1998 |
| JP | 2003-3300 A | 1/2003 |

* cited by examiner

METHOD FOR PROVIDING SURFACE TEXTURING OF ALUMINUM SHEET, SUBSTRATE FOR LITHOGRAPHIC PLATE AND LITHOGRAPHIC PLATE

BACKGROUND OF THE INVENTION

1. Field of the Invention

The present invention relates to a method for providing surface texturing of an aluminum sheet, a substrate for a lithographic plate, and to a lithographic plate. In particular, the invention relates to a method for providing concavo-convex texturing to an aluminum sheet used for, for example, producing a substrate for a lithographic plate by using an embossing form having a concavo-convex pattern formed on its surface and transferring the concavo-convex pattern of the embossing form to at least one surface of the aluminum sheet, particularly to a technique for forming a concavo-convex pattern on the embossing form.

2. Related Art

Articles which are produced by using an aluminum sheet as a substrate and providing surface texturing of the substrate surface so as to form a concavo-convex pattern on the same include, for example, substrates for lithographic plates and an aluminum decorative laminate.

As a method for providing surface texturing of an aluminum sheet, in more particular, a method for providing concavo-convex texturing, such as embossing, to the surface of an aluminum sheet for producing a substrate for a lithographic plate by rolling the aluminum sheet with a transferring roll having concaves or convexes formed on its surface, Japanese Patent Application Laid-open No. 60-36196 describes a method for providing embossing to the surface of an aluminum sheet using a pressure roll whose steel roll has its surface shot blasted. Japanese Patent Application Laid-open No. 62-25094 describes a method for providing embossing to the surface of an aluminum sheet by rolling the aluminum sheet using a steel roll which has undergone honing (Ra=0.5 to 1.5 µm and 500/mm² or more concaves or convexes of 0.6 µm or more deep) with a rolling reduction of 2 to 20%. Further, Japanese Patent Application Laid-open No. 62-111792 describes a method for providing embossing to the surface of an aluminum sheet by rolling the aluminum sheet using a roll which has undergone chemical etching or honing (Ra=0.5 to 1.5 µm, 500/mm² or more concaves or convexes of 0.6 µm or more deep) with a reduction of 2 to 20%. Still further, Japanese Patent Application Laid-open No. 62-218189 describes a method for providing embossing to an aluminum sheet by rolling the aluminum sheet using a roll having concaves or convexes formed on its surface by electrical discharge machining (Ra=0.7 to 1.7 µm, 500/mm² or more concaves or convexes of 0.6 µm or more deep) with a reduction of 2 to 20%.

Techniques for providing surface texturing of metal sheets include the following ones, though these are intended to provide surface texturing of an aluminum sheet for producing a substrate for a lithographic plate. For example, Japanese Patent Application Laid-open No. 10-99905 describes a method for producing an aluminum or aluminum alloy sheet of an intended thickness by cold rolling, wherein the rolling operation of the final pass is performed using a pressure roll whose surface is coated with hard chromium plating 3 to 12 µm thick and has a center-line average roughness in the direction of the roll axis, Ra, of 0.2 to 0.7 µm, so as to produce a less anisotropic aluminum or aluminum alloy sheet.

Japanese Patent Application Laid-open No. 10-328705 describes a method for producing an aluminum or aluminum alloy sheet by cold rolling, wherein the cold rolling operations are performed using a work roll for rolling whose surface is coated with hard chromium plating 3 to 12 µm, has surface projections formed on the chromium plate coating that satisfy the following conditions: $h/D \leq 0.2$ and $h \leq 1.5 - (2.5\, h/D)$ (where h represents the height of the surface projections and D the diameter of the circumscribed circle of plane of the same), and has a center-line average roughness in the direction of the roll axis, Ra, of 0.2 to 0.7 µm.

Japanese Patent Application Laid-open No. 10-259499 describes a method for roughening the surface of stainless steel sheet, wherein roughening was performed by applying alternating electrolysis to the stainless steel surface in an aqueous solution of ferric chloride to produce stainless steel sheet superior in adhesion to various covering materials. Further, Japanese Patent Application Laid-open No. 2003-3300 describes a method for roughening the surface of steel sheets other than stainless steel, such as ordinary steel or special steel sheets, wherein roughening is performed by using the steel sheet as an anode and subjecting the same to anodic electrolysis at a current density of 50 to 150 A/dm² while allowing oxygen bubbles to occur on the surface of the steel sheet, so as to enhance the adhesion of the steel to coated films or adhesives.

In the meantime, an aluminum decorative laminate is being used as members of cars, air conditioners, TV sets or radios with the object mainly of making such products more lightweight and providing the same with aesthetics and nobleness which other metals such as iron cannot provide. Or they are being used for interior decoration for aesthetic purpose. The main objectives of forming a concavo-convex pattern on an aluminum decorative laminate are: first to modify the glossiness and second to enhance paint adhesion when applying painting to the decorative laminates. Normally, an aluminum decorative laminate have been produced by rolling aluminum sheets using a transfer roll whose surface is provided with a concavo-convex pattern in relief by etching or engraving.

SUMMARY OF THE INVENTION

However, the techniques for providing surface texturing of aluminum sheets disclosed in Japanese Patent Application Laid-open Nos. 60-36196, 62-25094, 62-111792 and 62-218189 have the following disadvantages when they are employed for producing substrates for lithographic plates.

(1) It is known from prior art that in pressure rolls whose surface is provided with concaves or convexes, their service life is increased, if the peaks on their surface are all of the same level (hereinafter referred to as "height of peaks on the rolling surface"). However, in conventional rolls for use in rolling of aluminum sheets into substrates for litho printing plates, their roughened surface has been formed by hitting the surface with an abrasive by means of blasting, such as air blasting or shot blasting, without a technical concept of forming particular concaves or convexes. This gives rise to a problem of allowing the height of the peaks on the blasted surface to be non-uniform. Thus, conventional rolls have a short service life, and besides the aluminum substrates for lithographic plates produced using conventional rolls do not have particular concaves or convexes which are optimum in terms of printing characteristics of lithographic plates.

(2) When using rolls of prior art to provide concavo-convex texturing to an aluminum sheet and using the resultant aluminum sheet to produce an aluminum substrate for a lithographic plate, particularly an aluminum substrate for CTP plate (computer to plate technology which produces lithographic plate directly, not via a lithographic film, by allowing highly convergent radiant rays such as laser beams to carry digitized image information and scanning exposing a litho printing plate to the radiant rays), it is hard to obtain an aluminum substrate for a lithographic plate which excels in printing performance, particularly in plate wear (the number of printed copies) and sensitivity, and moreover, excels in resistance to stains.

(3) In the meantime, Japanese Patent Application Laid-open Nos. 10-99905, 10-328705, 10-259499 and 2003-3300 only describe methods for grinding (polishing) pressure rolls or methods for roughening the surface of aluminum sheets, and the methods do not involve a technique for providing surface texturing of an aluminum sheet for producing substrates for lithographic plates. Consequently, they do not disclose what kinds of concavo-convex pattern should be formed on an embossing form, which is to be used for forming concaves or convexes on an aluminum sheet for use in production of substrates for litho printing original plate.

Specifically, embossing forms obtained by prior art have a short service life, and litho printing plates which are made up of a substrate for a lithographic plate produced using an aluminum sheet having concaves or convexes formed on its surface using any one of the above embossing forms and a recording layer formed on the above substrate are not good in printing characteristics, particularly in plate wear (the number of printed copies) and sensitivity, and moreover, not good in resistance to stains.

(4) The concavo-convex patterns formed on conventional an aluminum decorative laminate are not satisfactory ones in terms of modification of glossiness and enhancement of paint adhesion. Furthermore, the service life of the embossing forms is also problematic, like substrates for lithographic plates produced using conventional aluminum sheet. Thus, it has been a problem to be solved how to form an embossing form which has a concavo-convex pattern on its surface and enables the production of an aluminum decorative laminate excellent in glossiness modification and paint adhesion.

The present invention has been made in the light of the above described circumstances. Accordingly, the object of the present invention is to provide: a method for providing surface texturing of an aluminum sheet which enables the enhancement of the service life of embossing forms (e.g. embossing rollers) used for transferring a concavo-convex pattern to aluminum sheets, enables the production of aluminum substrates for lithographic plates which are excellent in plate wear, sensitivity and resistance to stains, when applied to the production of substrates for lithographic plates, and enables the production of an aluminum decorative laminate which are excellent in glossiness and paint adhesion, when applied to the production of an aluminum decorative laminate; a substrate for a litho printing plate which is produced by the above method; and a lithographic plate produced using the above substrate for a lithographic plate.

The present inventors discovered that if a substrate for a lithographic plate is produced by: transferring a concavo-convex pattern to an aluminum sheet using an embossing form, for example, an embossing roller whose surface has a concavo-convex pattern of a particular surface roughness formed by electrical discharge machining so as to form concaves or convexes on at least one surface of the aluminum sheet; and subjecting the resultant aluminum sheet to chemical etching and electrochemical roughening, a lithographic plate can be produced which excels in printing performance, particularly in plate wear, sensitivity and resistance to stains, and besides, the service life of the embossing form can also be increased. Further, the technique in the present invention for forming a concavo-convex pattern of the embossing form by electrical discharge machining is applicable not only to production of substrates for lithographic plates, but also to production of an aluminum decorative laminate. The present inventors found that the use of an aluminum sheet having a concavo-convex pattern formed using the above described embossing form enables the production of an aluminum decorative laminate excellent in glossiness and paint adhesion, and besides, enables the increase in service life of the embossing form.

To accomplish the above described object, the first aspect of the present invention is a method for providing surface texturing of an aluminum sheet by using a surface-texturing device including an embossing form and transferring a concavo-convex pattern of the embossing form to at least one surface of the aluminum sheet, wherein the concavo-convex pattern of the embossing form to be transferred to the aluminum sheet is formed by electrical discharge machining.

According to the first aspect of the present invention, since the concavo-convex pattern of the embossing form is formed by electrical discharge machining, the peaks on the surface of the resultant embossing form are all of the same level or height, which enables the enhancement of the service life of the embossing form. Further, since the concavo-convex pattern of the embossing form is formed by electrical discharge machining, even a complicated and minute concavo-convex pattern can be formed. Accordingly, when applying the method for providing surface texturing of an aluminum sheet in accordance with the present invention to, for example, the production of a substrate for a lithographic plate, an aluminum substrate for a lithographic plate which excels in plate wear, sensitivity and resistance to stains can be produced. And when applying the same to the production of an aluminum decorative laminate, an aluminum decorative laminate which excel in glossiness and paint adhesion can be produced.

The second aspect of the present invention is the method for providing surface texturing of an aluminum sheet according to the first aspect of the present invention, wherein the aluminum sheet is an aluminum sheet used for producing a substrate for a lithographic plate and the concavo-convex pattern of the embossing form to be transferred to the aluminum sheet has an arithmetic mean roughness Ra of 0.3 μm or more and 1.0 μm or less and a mean spacing of profile irregularities RSm of 15 μm or more and 150 μm or less.

The measurement of the arithmetic mean roughness Ra and mean spacing of profile irregularities RSm of the concavo-convex pattern of the embossing form are made in accordance with ISO 4287.

According to the second aspect of the present invention, since the concavo-convex pattern of the embossing form is formed by electrical discharge machining, the peaks on the surface of the resultant embossing form are all of the same level or height, which enables the enhancement of the service life of the embossing form. Further, since the concavo-convex pattern formed on the embossing form has an arithmetic mean roughness Ra of 0.3 μm or more and 1.0 μm or less and a mean spacing of profile irregularities RSm of 15 μm or more and 150 μm or less, if a lithographic plate is produced using the substrate for a lithographic plate which is prepared by applying chemical etching and electrochemical roughening to an aluminum sheet having a concavo-convex pattern transferred to its surface using the above embossing form, the resultant lithographic plate excels in printing performance, particularly in the number of printed copies and sensitivity, and besides, excels in resistance to stains.

If the arithmetic mean roughness Ra of the concavo-convex pattern on the embossing form is less than 0.3 μm, the concavo-convex pattern of the embossing form cannot be satisfactorily transferred to an aluminum sheet. And when producing a substrate for a lithographic plate using this aluminum sheet, the resultant lithographic plate is poor in shininess. If the arithmetic mean roughness Ra of the concavo-convex pattern on the embossing form produced by electrical discharge machining is more than 1.0 μm, the convex portions are not all of the same height. As a result, when producing a substrate for a lithographic plate using this aluminum sheet, the resultant lithographic plate is poor in sensitivity. Accordingly, the concavo-convex pattern of the embossing form is required to have an arithmetic mean roughness Ra of 0.5 μm or more and preferably 0.6 μm or more. And the concavo-convex pattern of the embossing form is required to have an arithmetic mean roughness Ra of 1.0 μm or less and preferably 0.8 μm or less. Meanwhile, in the embossing form having a mean spacing of profile irregularities RSm of less than 15 μm, it is hard to transfer Ra satisfactorily to an aluminum sheet. And in the embossing form having a mean spacing of profile irregularities RSm of more than 150 μm, the surface area of the aluminum sheet having the concavo-convex pattern of the embossing form transferred on its surface is small. And when producing a substrate for a lithographic plate using this aluminum sheet, satisfactory plate wear cannot be obtained. Accordingly, the concavo-convex pattern of the embossing form is required to have a mean spacing of profile irregularities RSm of 15 μm or more and preferably 20 μm or more, and at the same time, 150 μm or less and preferably 100 μm or less.

The third aspect of the present invention is the method for providing surface texturing of an aluminum sheet according to the first aspect of the present invention, wherein the aluminum sheet is an aluminum sheet used for producing an aluminum decorative laminate.

According to the third aspect, since the concavo-convex pattern of the embossing form is formed by electrical discharge machining, the peaks on the surface of the resultant embossing form are all of the same level or height, which enables the enhancement of the service life of the embossing form. Further, since the concavo-convex pattern of the embossing form is formed by electrical discharge machining, an aluminum decorative laminate can be produced which excel in glossiness and paint adhesion. When producing an aluminum decorative laminate, an embossing form whose concavo-convex pattern has an arithmetic mean roughness Ra of 0.3 μm or more and 1.0 μm or less and a mean spacing of profile irregularities RSm of 15 μm or more and 150 μm or less can be used, just like the case where a substrate for a lithographic plate is produced.

The fourth aspect of the present invention is the method for providing surface texturing of an aluminum sheet according to any one of the first to third aspects of the present invention, wherein the electrical discharge machining is a negative-ion discharge type one where the working fluid contains kerosene and a material containing copper or brass is used as a discharge electrode and the voltage applied is 100 V or more and 400 V or less.

According to the fourth aspect, the surface material of the embossing form is melted and volatilized by the sparks of the electrical discharge machining, and at the same time, the kerosene contained in the working fluid is also locally heated and rapidly volatilized. The volume expansion of kerosene at the time of volatilization causes the trapping action of kerosene, whereby the surface material of the embossing form which is melted or volatilized by the high pressure generated in the neighborhood of the sparks is rapidly removed from the surface of the embossing form. From the viewpoint of forming minute concaves or convexes, it is preferable to use copper or brass, which has low electrical resistance, as a discharge electrode. The use of a negative-ion discharge type of electrical discharge machining enables the formation of a uniform concavo-convex pattern on an embossing form. Application of a higher voltage is preferable because it enables the discharge operation to be carried out while keeping the distance between the electrode the embossing form kept large, thereby increasing the efficiency of heat release or molten piece release; however, in the formation of a concavo-convex pattern of the present invention, the voltage applied is preferably 100 V or more and 400 V or less.

The fifth aspect of the present invention is the method for providing surface texturing of an aluminum sheet according to any one of the first to fourth aspects of the present invention, wherein the working fluid contains fine particles having an average particle size of 1 μm or more and 10 μm or less in amounts ranging from 1 g/liter or more to 20 g/liter or less and the fine particles includes those of at least one selected from the group consisting of graphite, silicon and molybdenum sulfide.

According to the fifth aspect of the present invention, setting the amount of the fine particles, which have an average particle size of 1 μm or more and 10 μm or less, contained in the working fluid in the range of 1 g/liter or more and 20 g/liter or less enables the formation of a finer concavo-convex pattern on the embossing form. As the fine particles, at least one selected from the group consisting of graphite, silicon and molybdenum sulfide can be preferably used.

The sixth aspect of the present invention is the method for providing surface texturing of an aluminum sheet according to any one of the first to fifth aspects of the present invention, wherein the Vickers hardness of the material for producing the embossing form is 500 Hv or more and 1500 Hv or less.

The Vickers hardness of the material is important in the life of the concaves or convexes on the embossing form produced by electrical discharge machining. If the Vickers hardness is less than 500 Hv, the arithmetic mean roughness Ra of the formed concavo-convex pattern rapidly decreases when the embossing form undergoes rolling operation, whereas if it is more than 1500 Hv, the brittleness is increased and the concaves or convexes might be fractured when the embossing form undergoes rolling operation.

The seventh aspect of the present invention is the method for providing surface texturing of an aluminum sheet according to any one of the first to sixth aspects of the present invention, wherein the material for preparing the above embossing form is coated with any one plating selected from the group consisting of: hard chrome plating; nickel plating that contains phosphorous or both phosphorous and boron; and chrome or nickel plating that can codeposit particles of at least one kind of compound selected from the group consisting of titanium carbide (TiC), tungsten carbide (WC), silicon carbide (SiC), boron carbide ($B_4C$) and titanium boride ($TiB_2$).

According to the seventh aspect, since a hard layer is formed on the surface of the embossing form, which is to undergo electrical discharge machining, preferred hardness, that is, Vickers hardness of 500 Hv or more and 1500 Hv or less can be obtained without forming the entire embossing form of hard material. The thickness of the hard layer in this case is preferably 5 μm or more and 300 μm or less and more preferably 15 μm or more and 100 μm or less.

The eighth aspect of the present invention is the method for providing surface texturing of an aluminum sheet according to the seventh aspect, wherein the plated layer formed by applying the above plating undergoes heat curing treatment at 300° C. or higher and 1000° C. or lower at least for 1 hour. This heat curing treatment provides the increased hardness to the hard layer, that is, the plated layer.

The ninth aspect of the present invention is the method for providing surface texturing of an aluminum sheet according to any one of the first to eighth aspects of the present invention, wherein the surface-texturing device which includes an embossing form for providing a surface texturing is an embossing roller whose circumference has the above described concavo-convex pattern formed on its surface and the embossing roller is used to cold roll the aluminum sheet so as to transfer the concavo-convex pattern to the aluminum sheet.

If an embossing roller is used as a surface-texturing device that includes an embossing form and the operation of transferring a concavo-convex pattern to an aluminum sheet is carried out using the embossing roller while rolling the aluminum sheet to a desired thickness, surface texturing is effectively performed because the transferring operation can be performed in the step of rolling. In this case, preferably the operation of transferring a concavo-convex pattern to an aluminum sheet is carried out in the cold rolling step in which the aluminum sheet is adjusted to the final thickness or in the finishing cold rolling step in which the surface geometry of the aluminum sheet after the final thickness adjustment is finished. This contributes to considerably decreasing the surface texturing cost. Normally, a concavo-convex pattern is transferred only to one surface (surface) of an aluminum sheet. However, a concavo-convex pattern should sometimes be transferred to the back surface of the aluminum sheet, too, that is, to both surfaces of an aluminum sheet, depending on the characteristics of a lithographic plate to be produced.

The tenth aspect of the present invention is the method for providing surface texturing of an aluminum sheet according to the ninth aspect, wherein the rolling reduction at the time of the cold rolling is 0.5 to 20%. The rolling reduction affects the transferring accuracy, and transferring with high accuracy can be performed at a rolling reduction of 0.5 to 20%. Preferably the rolling reduction at the time of the cold rolling is 1.0 to 8% and particularly preferably 1.0 to 5%.

To accomplish the above described object, a substrate for a lithographic plate as the eleventh aspect of the present invention is characterized in that it is produced by subjecting an aluminum sheet, which has the concavo-convex pattern of an embossing form transferred to its surface by a method for providing a surface texturing according to any one of the first, second, and fourth to tenth aspects of the present invention, to chemical etching and electrochemical roughening.

Subjecting an aluminum sheet, which has a concavo-convex pattern formed on its surface by a method for providing a surface texturing according to the present invention, to chemical etching and electrochemical roughening makes it possible to obtain a substrate for a lithographic plate having much more excellent printability.

A lithographic plate as the twelfth aspect of the present invention is characterized in that it comprises a recording layer formed on the substrate for a lithographic plate according to the eleventh aspect of the present invention.

An original lithographic plate made up of: a substrate for a lithographic plate which is prepared by subjecting an aluminum sheet having concaves or convexes formed on its surface by the surface texturing method of the present invention to chemical etching and electrochemical roughening; and a recording layer formed on the above substrate for a lithographic plate excels in printing performance, particularly in plate wear, sensitivity and resistance to stains.

The method for providing surface texturing of an aluminum sheet of the present invention, the substrate for a lithographic plate prepared by the above method and the lithographic plate produced using the above substrate enable the enhancement of the service life of an embossing form (e.g. an embossing roller) used for transferring a concavo-convex pattern to an aluminum sheet, enables the production of aluminum substrates for lithographic plates which excel in plate wear, sensitivity and resistance to stains when applied to the production of substrates for lithographic plates, and enables the production of an aluminum decorative laminate which excel in glossiness and paint adhesion when applied to the production of an aluminum decorative laminate.

DETAILED DESCRIPTION OF THE PREFERRED EMBODIMENTS

Figure 1:
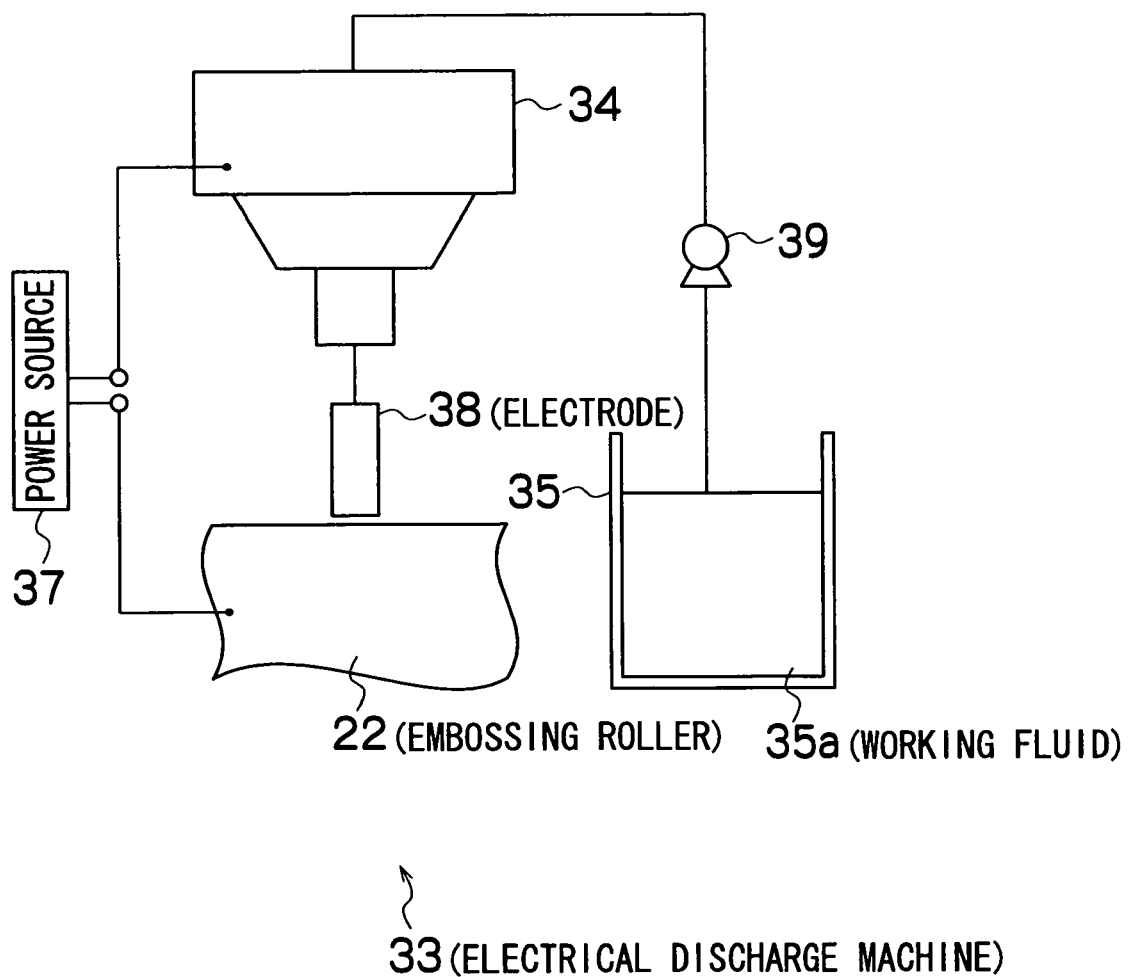
FIG. 1 is a schematic view showing an electrical discharge machine for forming a concavo-convex pattern on the rolling surface of an embossing roller.
Figure 2:
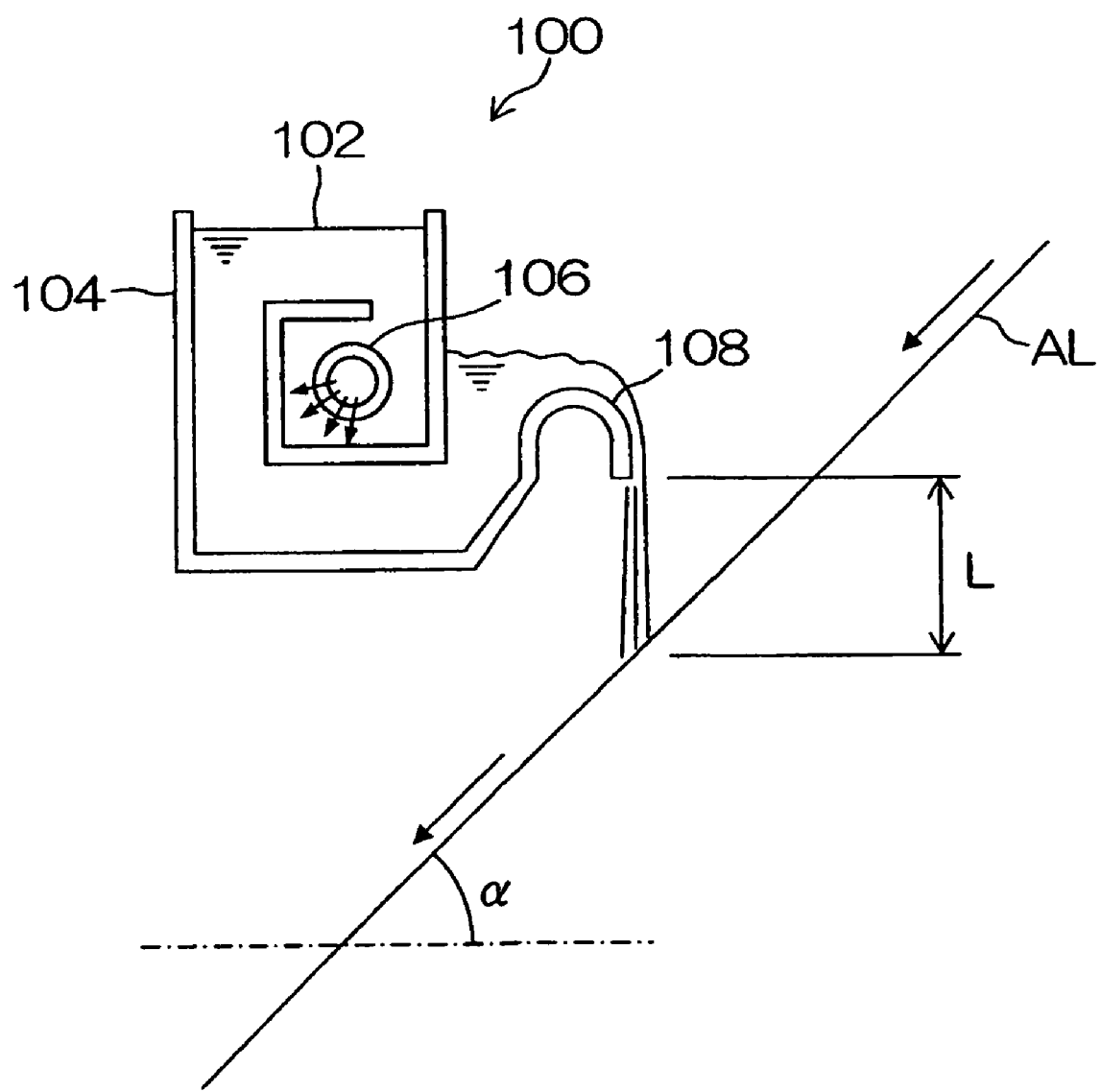
FIG. 2 is a conceptual diagram of a rinsing apparatus which performs rinsing by means of free falling curtain-like liquid film and is used in the rinsing treatment in the method for producing a substrate for a lithographic plate in accordance with the present invention.

In the following, the preferred embodiments of the method for providing surface texturing of an aluminum sheet, the substrate for a lithographic plate and the lithographic plate in accordance with the present invention will be described in detail with reference to the accompanying drawings. Although the embodiments of the present invention will be described mainly by examples in which substrates for lithographic plates are prepared, it goes without saying that the technique for forming a concavo-convex pattern on an embossing form by electrical discharge machining is also applicable to the production of an aluminum decorative laminate. And the embodiments will also be described by examples in which embossing rollers (sometimes referred too as transfer rollers) are used as a surface-texturing device that includes an embossing form; however, a flat embossing form may also be used to press an aluminum plate so that the concavo-convex pattern of the embossing form may be transferred to an aluminum sheet.

After directing tremendous research efforts toward resolving the aforementioned problem, the present inventors discovered that if a substrate for lithographic plate is produced by: forming concaves or convexes on an aluminum sheet by rolling the aluminum sheet using an embossing roller having a specific surface roughness profile and; and subjecting the resultant aluminum sheet to chemical etching and electrochemical roughening, a lithographic plate can be produced which excels in printing performance, particularly in plate wear, sensitivity and resistance to stains. As a result, they have invented a method for forming concaves or convexes on the surface of an aluminum sheet.

Preferably, an aluminum sheet which has concaves or convexes formed on its surface by the surface texturing method of the present invention is used for a substrate for a lithographic plate. Most preferably, it is used for a substrate for a CTP lithographic plate. In the aluminum sheet which has concaves or convexes formed on its surface by the surface texturing method of the present invention, steep and deep concave portions are hard to produce, and therefore a highly sensitive substrate for a lithographic plate can be obtained.

[Method for Forming Concaves or Convexes on Surface of Aluminum Sheet]

The surface texturing method in accordance with the present invention is to form concaves or convexes on the surface of an aluminum sheet by: first forming a concavo-convex pattern on the surface of a roll by means of electrical discharge machining so that the arithmetic mean roughness Ra of the concavo-convex pattern is 0.3 μm or more and 1.0 μm or less; and then rolling an aluminum sheet with a steel embossing roller having a mean spacing of profile irregularities RSm of 15 μm or more and 150 μm or less.

<Characteristics of Surface of Embossing Roller>

In the embossing roller which is used in the method for providing surface texturing of an aluminum sheet in accordance with the present invention, the surface of its roll undergoes roughening by electrical discharge machining so that it has a geometry with an arithmetic mean roughness Ra of 0.3 μm or more and 1.0 μm or less and a mean spacing of profile irregularities RSm of 15 μm or more and 150 μm or less. If Ra is less than 0.3 μm, concaves or convexes cannot be satisfactorily transferred to an aluminum sheet. As a result, when preparing a substrate for a lithographic plate using such an aluminum sheet and producing a lithographic plate using the substrate, the resultant lithographic plate is poor in shininess. If the surface of the roll undergoes electrical discharge machining to have Ra of more than 1.0 μm, the height of the convex portions is not all the same. As a result, when preparing a substrate for a lithographic plate using such an aluminum sheet and producing a lithographic plate using the substrate, the resultant lithographic plate is poor in sensitivity. Thus, the arithmetic mean roughness Ra of the surface of the roll of an embossing roller is preferably 0.5 μm or more and more preferably 0.6 μm or more, and at the same time, it is preferably 0.9 μm or less and more preferably 0.8 μm or less. The above descried range is a preferable range from the viewpoint of preparing a substrate for a lithographic plate having excellent concaves or convexes which enables the production of a lithographic plate excellent in both shininess and sensitivity.

With the roll which has a mean spacing of profile irregularities RSm of less than 15 μm, it is difficult for the aluminum sheet after rolling to have a satisfactory Ra. On the other hand, with the roll which has an RSm of more than 150 μm, when forming a substrate for a lithographic plate with an aluminum sheet provided with a surface texturing by means of such a roll and using the substrate to produce a lithographic plate, the resultant lithographic plate is not such that it enables the production of a satisfactory number of printed copies. Thus, the mean spacing of profile irregularities RSm is preferably 15 μm or more and more preferably 20 μm or more. At the same time, the RSm is preferably 150 μm or less and more preferably 100 μm or less. The reason for this is that if the RSm is too large, the surface area of the lithographic plate becomes small, which results in poor plate wear.

<Method for Producing Embossing Roller>

Any methods for producing an embossing roller can be used in the present invention; however, particularly preferable is the following method.

[1] Material and Pretreatment for Embossing Roller

As embossing rollers, steel rollers, particularly forged steel rollers are preferably used. However, the material for the roll of the embossing roller used in the present invention is not limited to any specific one. Any kinds of steel such as common steel, tool steel (SKD), which is commonly used for pressure rolls, high speed tool steel (SKH), high carbon chromium bearing steel (SUJ) and forged steel which contains alloy elements of carbon, chromium, molybdenum and vanadium can be used. To increase the service life of the roll, high chromium alloy cast steel that contains 10 to 20% by mass of chromium may also be used.

The surface of the embossing roller is honed in advance with abrasive stones etc. so as to ensure its cylindricity and parallelism; however, a microscope can observe the existence of linear concaves or convexes even on such a honed surface. If linear concaves or convexes are removed from the surface by providing the surface with a mirror finish, convex portions of all of the same height are easier to obtain after the surface of the roller is roughened by electrical discharge machining. Mirror finish operations include, for example, grinding with abrasive stones, buffing and electropolishing. Of these operations, buffing is particularly preferable. Preferably, the embossing roller used in the present invention is subjected to hardening treatment such as quenching or radical nitriding, before performing electrolysis using the roller as an anode.

Before concaves or convexes are mechanically or electrochemically formed on the surface of the roll of the embossing roller, preferably the arithmetic mean roughness Ra of the surface is 0.01 to 0.3 μm and the maximum height Ry of the same is 0.01 to 3 μm and particularly preferably Ra is 0.15 to 0.25 μm and Ry 0.05 to 2 μm. A surface having an Ra of less than 0.01 μm is hard to obtain at low cost, and if Ra is more than 0.3 μm, when mechanically or electrochemically forming concaves or convexes on the surface of the roller, the height of the convex portions of the rolling surface is not all the same, which can sometimes result in short service life of the embossing roller. A surface having an Ry of less than 0.01 µm is hard to obtain at low cost, and if Ry is more than 0.3 µm, when mechanically or electrochemically forming concaves or convexes on the surface of the roller, the height of the convex portions of the rolling surface is not all the same, which can sometimes result in short service life of the embossing roller.

[2] Step of Forming Concaves or Convexes on Rolling Surface of Embossing Roller

The embossing form of an embossing roller will be described in detail. The embossing roller can be prepared by a variety of methods for forming concaves or convexes on the metal surface, such as electrical discharge machining, shot blasting, etching and laser machining. In the present invention, it is important to apply electric discharge machining.

FIG. 1 is a schematic view showing an electrical discharge machine which forms a concavo-convex pattern on the rolling surface (embossing portion) of an embossing roller for transferring a concavo-convex pattern to aluminum sheets in the method for providing surface texturing of an aluminum sheet in accordance with the present invention.

An electrical discharge machine 33 is made up mainly of a head 34, a feed tank 35 which feeds working fluid 35a, a power source 37 and an electrode 38. The electrode 38 and an embossing roller 22, as an object of machining, are in close proximity to each other and the working fluid 35a in the feed tank 35 is pumped by a pump 39 through the head 34 to the electrode 38. The working fluid 35a then reaches the spots to be machined on the surface of the embossing roller 22 as an object of machining. Since both the surfaces of the electrode 38 and the embossing roller 22 are not perfectly smooth, once the power source is turned on, the electric field strength is gradually increased, and at some spot on the surface of the electrode 38 or the embossing roller 22 it eventually reaches a large value enough to cause local electrolytic dissociation of the working fluid 35a. As a result, spark discharge occurs between the electrode and the embossing roller. And each single-electrical discharge produces a very small crater on the surface of the embossing roller 22. The accumulation of the craters leads to the formation of a concavo-convex pattern (an embossed pattern) on the surface of the roller of the embossing roller. In this case, it is possible to provide another working fluid tank so that electric discharge is performed while immersing the embossing roller 22 and the electrode 38 in the working fluid 35a.

Since the temperature of the discharge sparks can be several thousands degrees centigrade or higher, in the very small regions where spark discharge occurs, the material for the surface of the embossing roller 22 melts or volatilizes. In the embodiments of the present invention, kerosene, which is used as the working fluid 35a, is also locally heated by the spark discharge, and it rapidly volatilizes and expands in volume. This causes the trapping action of the surrounding kerosene under its own inertia, thereby producing high pressure in the neighborhood of the sparks. And the melted and volatilized material of the embossing roller 22 is rapidly removed from its surface by the high pressure generated in the neighborhood of the sparks. In this case, the working fluid 35a can contain kerosene. Driving the embossing roller 22 across the width rotationally allows its entire outer peripheral surface to undergo electrical discharge machining continuously. However, the method for providing electrical discharge machining to the entire outer peripheral surface of the embossing roller 22 is not limited to the continuous-type machining carried out while driving the roller 22 across the width rotationally, as described above, but continuous-type machining carried out while operating the electrode or discontinuous-type of machining carried out for each prescribed region of the surface may also be employed.

As the metal of at least the surface of the roller, an embossing form portion, of the embossing roller 22, any iron alloys that contain carbon and chromium can be used, as long as their Vickers hardness is 500 Hv or more and preferably 500 Hv or more and 1500 Hv or less. Such metals include, for example, high carbon steel, chrome molybdenum steel and stainless steel. The Vickers hardness herein used is a physical value expressed by a load applied to a test material using a diamond indenter, in the form of a square-based pyramid with an angle of 136° between the opposite faces at the vertex, and the diagonal length of the pyramidal indentation on the test material surface after the load has been removed. The preferred hardness is, however, not limited to the above described values, which are in accordance with the Vickers hardness, but any hardness values in accordance with other measuring methods may also be applied, as long as they are at levels equivalent to those of the above described preferred values.

To provide the increased hardness to the rolling surface of the embossing roller, nitriding or plating can be applied. Nitriding is a process in which a nitrogen compound such as ammonia is introduced under vacuum to react with iron alloys, represented by stainless steel, at elevated temperatures. Plating is represented by hard chrome plating, and other examples of plating include: nickel plating that contains phosphorus, or phosphorus and boron (KANIGEN plating, KANIBORON plating by JAPAN KANIGEN Co., Ltd.); and chrome or nickel plating that can codeposit particles of at least one kind of compound selected from the group consisting of titanium carbide (TiC), tungsten carbide (WC), silicon carbide (SiC), boron carbide ($B_4C$) and titanium boride ($TiB_2$). The plating is applied to the surface of embossing form portion before forming a concavo-convex pattern. After providing such a plated layer (a hard layer), preferably the plated layer is subjected to heat curing treatment at 300° C. or higher and 1000° C. or lower at least for 1 hour. Eutectoid herein used is a phenomenon that two kinds or more of solids are co-deposited from a liquid as the liquid is getting cooled. The thickness of the hard plated layer is preferably 5 µm or more and 300 µm or less and more preferably 15 µm or more and 100 µm or less.

The hardness, melting point and coefficient of heat conductivity are significant parameters of the material for the rolling surface, to which electrical discharge machining is applied, of the embossing roller 22, and they affect the shape into which or speed at which the surface is carved by the heat generated by the electrical discharge. Specifically, when using materials different in hardness or melting point for the respective rolling surfaces, even if the quantity of heat generated by electrical discharge is the same, the amount or shape of the rolling surfaces carved by the melting of the materials becomes different. Further, the coefficient of heat conductivity affects the speed at which the heat locally generated by spark discharge diffuses in the material, and therefore it is reflected in the spacing or depth of profile irregularities.

When subjecting the rolling surfaces of the embossing roller 22 to the above described various kinds of hardening treatment, in the resultant rolling surfaces, the concavo-convex pattern of the embossing roller 22 obtained by the same electrical discharge machining differs from the rolling surface to rolling surface not only in the arithmetic mean roughness Ra and the mean spacing of profile irregularities RSm, but also in the composite wave shape formed by the overlapping of various sizes of concaves or convexes and the irregularities of concaves or convexes arrangement. Thus, hardening treatment greatly affects the characteristics of the aluminum sheet provided with a concavo-convex pattern, not only the characteristics apparently depending on the surface geometry, such as plate wear and sensitivity, but also the characteristics such as shininess and resistance to stains. If electrical discharge machining is employed to form the concavo-convex pattern of the embossing roller 22, like the present invention, and the combination of the conditions under which electrical discharge machining is carried out and the material for the rolling surface of the embossing roller 22 is properly established, aluminum sheets having various characteristics can be produced.

In the present invention, electrical discharge machining can be performed using a general-purpose die sinking electrical discharge machine (e.g. one by Mitsubishi Electric Corporation or Sodick Co.). To obtain a minute concavo-convex pattern, a model equipped with CAD/CAM function which is capable of performing position control in μm is preferably used.

Electrical discharge machining is classified into two types: a positive ion-discharge type in which a positive voltage is applied to the electrode and a negative ion-discharge type in which a negative voltage is applied to the electrode. In the present invention, an electrical discharge machining using a negative electrode is preferably used. In a positive ion-discharge type of electrical discharge machining, since the quantity of heat generated on the surface of a work is large, machining is carried out at a higher speed; however, it can sometimes form a non-uniform concavo-convex pattern. On the other hand, in a negative electrical discharge machining using a negative electrode, it can form a more uniform concavo-convex pattern on the surface of the embossing roller 22, though the electrode consumption is high.

In the present invention, it is preferable to use copper, which has low electrical resistance and a high coefficient of heat conductivity, for the discharge electrode. In this case, to allow each local discharge to be minute and discharge energy to be small so as to form a very fine concavo-convex pattern, a plane electrode is preferably used. The thickness of the plane electrode is preferably 5 mm or less, more preferably 3 mm or less and most preferably 2 mm or less. When a copper electrode is insufficient in rigidity, it is preferable to use brass for the discharge electrode.

The discharge voltage can be controlled by generating pulses on the power source surface or by capacitor discharge utilizing the RC circuit formed by the power source circuit and the electrical discharge machine. The improvement of power source switching technology in recent years makes it possible to control pulses precisely even at high voltage-current; however, in the present invention, capacitor discharge is preferable because it provides a uniform concavo-convex pattern over a large area. When inducing discharges to an irregular and fine concavo-convex surface (the rolling surface before a concavo-convex pattern is formed on it), which is the target of the present invention, it is difficult to control the discharge voltage by the generation of pulses on the power source surface and the waveform of the discharge current is in disorder.

In respect to voltage applied, the higher, the better. This is because higher voltage allows discharges to be induced even when the distance between the electrode and the embossing roller 22 is kept large, which leads to increase in efficiency of releasing heat or melted pieces. Usually the voltage applied is 100 V or more and 500 V or less, which corresponds to the upper limit of a semiconductor power source; however, in the present invention, it is preferably 100 V or more and 400 V or less.

As the working fluid 35a for the electrical discharge machining in the present invention, various types of kerosene, which is commonly used working fluid, can be used. Addition, to kerosene, of fine particles of graphite, silicon, molybdenum sulfide, alumina or silicon carbide having an average particle size of 1 μm or more and 10 μm or less at a concentration of 1 g/liter or more and 20 g/liter or less makes it possible to apply minute concavo-convex patterning to the rolling surface. These particles may be used alone or in combination.

<Method for Forming Concaves or Convexes on the Surface of Aluminum Sheet with Embossing Roller>

In the present invention, preferably concaves or convexes are formed on an aluminum sheet as described above in a rolling step of rolling the aluminum sheet by performing operations such as press-rolling and transferring using the embossing roller 22 of the present invention.

Preferably, a method is employed in which a concavo-convex pattern is formed on an aluminum sheet in a rolling step, particularly in a cold rolling step of cold rolling the aluminum sheet to final thickness or in a cold finish rolling step of cold rolling the aluminum sheet having undergone final thickness adjustment to provide the same a final surface geometry, by pressing the concavo-convex surface of the embossing roller 22 against the aluminum sheet to transfer the concavo-convex pattern to the same. The process for forming concaves or convexes on the surface of an aluminum sheet is simplified by performing the concavo-convex transferring step and the cold rolling step at the same time, whereby great cost reduction is made possible. One specific example of such methods is described in Japanese Patent Application Laid-open No. 6-262203.

As described above, if a substrate for a lithographic plate is produced using an aluminum sheet on which concaves or convexes have been transferred by the embossing roller 22 of the present invention, which has a particular concavo-convex pattern on its rolling surface, the resultant substrate for a lithographic plate has a concavo-convex pattern whose mean pitch and depth are more uniform than that of a substrate for a lithographic plate whose concaves or convexes are formed using brushes and an abrasive. Thus, the substrate for a lithographic plate produced using such an aluminum sheet has improved resistance to stains. Further, the method for forming concaves or convexes on an aluminum sheet in accordance with present invention makes it easy to adjust the amount of damping water used on a printing machine, while decreasing the amount of energy consumed in the alkali etching treatment and surface roughening treatment performed after the surface texturing operation of the present invention. Thus, the substrate for a lithographic plate produced using such an aluminum sheet has excellent shininess. Further, etching amount can be decreased to as small as about 10 g/m$^2$ or less in the first alkali etching treatment described later, whereby cost reduction is made possible. Still further, the use of an aluminum sheet having a concavo-convex pattern on it surface allows the surface area of a substrate for a lithographic plate to be increased, the substrate for a lithographic plate produced using such an aluminum sheet has excellent plate wear.

Preferably, the operation of transferring a concavo-convex pattern to an aluminum sheet with an embossing roller is performed in a final cold rolling step which is employed in a typical aluminum sheet. Preferably, the concaves or convexes are formed on both surfaces of an aluminum sheet by the transferring operation. This makes it possible to adjust the elongation of both front and back surfaces of the aluminum sheet to the same degree, and thus making it possible to obtain an aluminum sheet good in flatness.

The rolling reduction in rolling an aluminum sheet using the above described embossing roller 22 is preferably 0.5 to 20%, more preferably 1 to 8% and most preferably 1 to 5%. The rolling for transferring may be performed by 1 to 3 passes. The surface geometry of the aluminum sheet on which a concavo-convex pattern has been formed by the surface-texturing providing method of the present invention is preferably such that Ra, RSm, Ry and $\Delta a$ specified by JIS (Japanese Industrial Standards) are in the range of 0.4 to 1.0 µm, 15 to 150 µm, 1 to 10 µm and 1 to 10 degrees, respectively.

[Aluminum Substrate]

<Aluminum Sheet>

An aluminum sheet which can be used in the present invention as a substrate for lithographic plates is made of a metal that contains aluminum, a dimensionally stable metal, as a chief component—that is, an aluminum sheet applicable to the present invention is made of aluminum or an aluminum alloy. Examples of such aluminum sheets include: besides a pure aluminum sheet, an aluminum alloy sheet which contains aluminum, as a chief component, and very small amounts of other elements; and plastic film or paper on which aluminum or an aluminum alloy is laminated or deposited. In addition, a composite sheet made up of an aluminum sheet and a polyethylene terephthalate film bonded to the aluminum sheet, as described in Japanese Patent Application Laid-open No. 48-18327, can also be used in the present invention.

In the following description, the above described types of substrates, which are made of aluminum or an aluminum alloy or include a layer made up of aluminum or an aluminum alloy, will be generically called aluminum sheets. The elements, other than aluminum, which can be contained in the above described aluminum alloys include: for example, silicon, iron, manganese, copper, magnesium, chromium, zinc, bismuth, nickel and titanium. The contents of such elements in the alloys are 10% by mass or less.

In the present invention, it is preferable to use a pure aluminum sheet. However, since pure aluminum is hard to produce by the existing refining technologies, an aluminum sheet that contains small amounts of other elements can also be used. Thus, the composition of the aluminum sheet used in the present invention is not limited to any specific one, and known and currently used aluminum alloy sheets, such as JIS A1050, JIS A 1100, JIS A3005 and internationally registered alloy 3103A, can be appropriately used depending on the situation.

The thickness of the aluminum sheet used in the present invention is about 0.1 mm to 0.6 mm, preferably 0.15 mm to 0.4 mm and more preferably 0.2 mm to 0.3 mm. The thickness can be changed appropriately depending on the size of the printing machine used, the size of the printing plate used or the requests of users.

Preferably, the aluminum sheet having been subjected to tempering H18 specified in JIS is used in the present invention.

The aluminum sheet thus produced is expected to have various characteristics described below.

In respect to the strength of the aluminum sheet, to ensure the elasticity which substrates for lithographic plates are required to have, the 0.2% proof strength of the aluminum sheet is preferably 120 MPa or more. To ensure a certain degree of elasticity even when performing burning treatment, the 0.2% proof strength of the aluminum sheet after 3 to 10-minute heating at 270° C. is preferably 80 MPa or more and more preferably 100 MPa or more. When needing an aluminum sheet having an elasticity, an aluminum material that contains Mg or Mn can be employed. However, aluminum sheets having a certain degree of elasticity tend to deteriorate in ease of fitting to a plate cylinder of a printing machine, and therefore the material or the amount of components, other than aluminum, added should be appropriately selected depending on the applications in which the aluminum sheets are used. There are described technologies relating to this subject, which the applicant of the present invention has proposed, in Japanese Patent Application Laid-open Nos. 7-126820 and 62-140894.

Preferably, the aluminum sheet has a tensile strength of $160\pm15$ N/mm$^2$, a 0.2% proof strength of $140\pm15$ MPa, and a strain under tension, specified in JIS Z2241 and Z2201, of 1 to 10%.

Preferably the crystalline texture of the surface of the aluminum sheet is not very coarse, because it may cause surface defect when the surface of the aluminum sheet undergoes chemical or electrochemical roughening treatment. The crystalline texture of the surface of the aluminum sheet is preferably 200 µm or less, more preferably 100 µm or less and much more preferably 50 µm or less in width; and preferably 5000 µm or less, more preferably 1000 µm or less and much more preferably 500 µm or less in length. There are described technologies relating to this subject, which the applicant of the present invention has proposed, in Japanese Patent Application Laid-open Nos. 6-218495, 7-39906 and 7-124609.

The aluminum sheet used in the present invention is a continuous strip-like sheet or web. That is, it may be an aluminum web or an aluminum sheet cut to a size that corresponds to the size of the lithographic original plate to be shipped as a product.

The surface flaws of the aluminum sheet may cause surface defect when the aluminum sheet is processed into substrates for lithographic plates, and thus flaws must be prevented from occurring as much as possible at a stage before subjecting the aluminum sheet to surface treatment to form into substrates for lithographic plates. Thus, the type of packing of the aluminum sheet is preferably a stable one that prevents flaws from occurring in transit.

In the case of aluminum webs, the type of packing is, for example, as follows. First, hardboard and felt are spread on an iron pallet, a doughnut-shaped corrugated board is applied to each end of the product, the entire product is wrapped with poly-tube, a wood doughnut is inserted into the inside diameter portion of the coil, felt is applied to the peripheral portion of the coil, the felt is fastened with tie plates, and a label is put on the peripheral portion. As a packaging material, polyethylene film can be used. And as a cushioning material, needle felt or hardboard can be used. There are various types of packing, besides the above described one, and any types of packing are applicable to the aluminum sheet used in the present invention, as long as they allow the aluminum sheet to be transported stably and without causing flaws.

<Roughening of Aluminum Sheet having Concaves or Convexes transferred on its Surface>

The aluminum sheet having concaves or convexes transferred on its surface subsequently undergoes chemical etching treatment and electrochemical roughening treatment to be formed into aluminum substrates for lithographic plates. The resultant substrates are then coated with a recording layer such as a photosensitive layer to be formed into lithographic original plates. Treatment such as mechanical roughening, chemical roughening, electrochemical roughening, anodic oxidation, hydrophilization or sealing may also be performed.

Preferred embodiments of surface treatment are as follows.

1) Surface Treatment Embodiment 1
   A method for subjecting the aluminum sheet to:
   (1) chemical etching treatment;
   (2) electrochemical roughening treatment in an aqueous solution composed mainly of nitric acid;
   (3) chemical etching treatment;
   (4) electrochemical roughening treatment in an aqueous solution composed mainly of hydrochloric acid;
   (5) chemical etching treatment; and
   (6) anodizing in this order.

2) Surface Treatment Embodiment 2
   A method for subjecting the aluminum sheet to:
   (1) chemical etching treatment;
   (2) electrochemical roughening treatment in an aqueous solution composed mainly of nitric acid;
   (3) chemical etching treatment; and
   (4) anodizing in this order.

3) Surface Treatment Embodiment 3
   A method for subjecting the aluminum sheet to:
   (1) chemical etching treatment;
   (2) electrochemical roughening treatment in an aqueous solution composed mainly of hydrochloric acid;
   (3) chemical etching treatment; and
   (4) anodizing in this order.

4) Surface Treatment Embodiment 4
   A method for subjecting the aluminum sheet to:
   (1) chemical etching treatment;
   (2) electrochemical roughening treatment in an aqueous solution composed mainly of hydrochloric acid;
   (3) chemical etching treatment;
   (4) electrochemical roughening treatment in an aqueous solution composed mainly of nitric acid;
   (5) chemical etching treatment; and
   (6) anodizing in this order.

5) Surface Treatment Embodiment 5
   A method for subjecting the aluminum sheet to:
   (1) chemical etching treatment;
   (2) electrochemical roughening treatment in an aqueous solution composed mainly of hydrochloric acid;
   (3) chemical etching treatment;
   (4) electrochemical roughening treatment in an aqueous solution composed mainly of hydrochloric acid;
   (5) chemical etching treatment; and
   (6) anodizing in this order.

Preferably, hydrophilization treatment, sealing treatment, or both hydrophilization treatment and sealing treatment are performed after anodizing. And particularly preferably, sealing treatment or both hydrophilization treatment and sealing treatment are performed after anodizing.

Preferably, desmutting is performed in an acidic aqueous solution after chemical etching treatment.

<Mechanical Roughening Treatment>

In the production method in accordance with the present invention, the above described aluminum sheet having a concavo-convex pattern on its surface may or may not undergo mechanical roughening treatment using a rotating brush and an abrasive described below.

Performing mechanical roughening treatment using a rotating brush and an abrasive makes it possible to ensure a larger surface area by subsequent brush grain treatment even where the surface area provided by the transferred concavo-convex pattern is small, thereby allowing the surface of the aluminum sheet to have proper water-carrying properties. It also contributes to solving the problem attendant to the mechanical roughening treatment using a conventional brush and an abrasive—that is, the problem of forming point-shaped concaves or convexes, thereby making the coatings more likely to be left and smut more likely to remain at the edge portions. Further, it makes it possible to decrease the amount of alkali etching subsequently performed, which is advantageous in terms of cost reduction.

In the following, brush grain method, which is suitably used for mechanical roughening treatment, will be described.

Usually, brush grain method is carried out using roller-like brushes, each of which is made up of a cylindrical drum and a large number of bristles of synthetic resin, such as nylon (trademark), propylene and vinyl chloride resin, implanted into the cylindrical drum, in such a manner as to rub one surface or both surfaces of the above described aluminum sheet with the roller-like brushes while spraying a slurry containing an abrasive over the rotating roller-like brushes. Instead of the above described roller-like brushes and slurry, abrasive rollers, which each have an abrasive layer provided on its surface, can be used.

When using roller-like brushes, bristles are used which have a modulus in flexure of preferably 10,000 to 40,000 kg/cm$^2$ and more preferably 15,000 to 35,000 kg/cm$^2$ and an elasticity of preferably 500 g or less and more preferably 400 g or less. The diameter of the bristles is typically 0.2 to 0.9 mm. The length of the bristles can be determined appropriately depending on the outside diameter of the roller-like brush and the diameter of the drum; however, it is typically 10 to 100 mm.

The number of nylon brushes used is preferably more than one, more preferably 3 or more and particularly preferably 4 or more. Adjusting the number of brushes used makes it possible to adjust the wave length component of the concave portion formed on the surface of the aluminum sheet.

The load on the driving motor which rotates the brush is preferably heavier, by 1 kW or more, than that before the roller-like brush is pressed against the aluminum sheet, more preferably by 2 kW or more and particularly preferably 8 kW or more. The adjusting the load makes it possible to adjust the depth of the concave portion formed on the surface of the aluminum sheet. The number of revolution of the brush is preferably 100 or more and particularly preferably 200 or more.

As the abrasive, any known abrasives can be used. Examples of such abrasives include: pumice stone, silica sand, aluminum hydroxide, alumina powder, silicon carbide, silicon nitride, volcanic ashes, carborundum, emery, and mixtures thereof. Of these abrasives, pumice stone and silica sand are preferable. Silica sand is superior to pumice stone in roughening efficiency because it is harder than pumice stone and hard to break. Aluminum hydroxide is suitably used when intending to prevent the local formation of deep concave portion, since its particles are broken when excessive load is applied.

There is described in detail an apparatus for doing mechanical roughening treatment using brushes and an abrasive, which the applicant of the present invention has proposed, in Japanese Patent Application Laid-open No. 2002-211159.

In the present invention, when performing mechanical roughening treatment using rotating brushes and an abrasive on the aluminum sheet that has a concavo-convex pattern formed on its surface by transferring, the increment in Ra is preferably 0.3 µm or less, more preferably 0.2 µm or less and much more preferably 0.1 µm or less.

<Chemical Surface Treatment>

In the method for producing a substrate for a lithographic plate in accordance with the present invention, a substrate for a lithographic plate is obtained by applying chemical etching treatment and electrochemical roughening treatment (in the present invention, the term "chemical surface treatment" is used for both of these types of treatment together) to the aluminum sheet having a concavo-convex pattern formed on its surface by transferring.

As the roughening treatment, any one type of treatment selected from the roughening treatment embodiments 1 to 5 is preferably applied. In one example of roughening treatment, etching treatment in alkaline aqueous solution (first), desmutting in an acidic aqueous solution (first), electrochemical roughening treatment in an aqueous solution that contains nitric acid or hydrochloric acid, etching treatment in an alkaline aqueous solution (second), desmutting in an acidic aqueous solution (second), electrochemical roughening treatment in an aqueous solution that contains hydrochloric acid, etching treatment in an alkaline aqueous solution (third), desmutting in an acidic aqueous solution (third) and anodizing are applied in this order.

The method for producing a substrate for a lithographic plate in accordance with the present invention may include various steps other than the above described ones.

Application of hydrophilization treatment after the above described anodizing is also preferable.

In the following, each of the surface treatment steps will be described in detail.

<First Alkali Etching Treatment>

Alkali etching treatment is treatment which dissolves the surface layer of the above described aluminum sheet by bringing the aluminum sheet into contact with an alkaline solution.

The first alkali etching treatment performed before the first electrolysis is intended to form uniform concave portions by the first electrolysis and remove the rolling oil, smut, natural oxide, etc. on the surface of the aluminum sheet (rolled aluminum).

In the first alkali etching treatment, the etching amount is preferably 0.1 g/m² or more, more preferably 0.5 g/m² or more and much more preferably 1 g/m² or more, and at the same time, it is preferably 10 g/m² or less, more preferably 8 g/m² or less and much more preferably 5 g/m² or less. Keeping the minimum value of the etching amount within the above described range makes it possible to form uniform pits by the first electrolysis, and moreover, to prevent the occurrence of treatment non-uniformity. Keeping the maximum value of the etching amount within the above described range makes it possible to decrease the amount of the alkaline solution used, which is advantageous from the economic point of view.

Alkalis applicable to the alkaline solution include: for example, caustic alkalis and alkali metal salts. Specific examples of caustic alkalis are: caustic soda and caustic potash. Specific examples of alkali metal salts are: alkali metal silicates such as sodium metasilicate, sodium silicate, potassium metasilicate and potassium silicate; alkali metal carbonates such as sodium carbonate and potassium carbonate; alkali metal aluminates such as sodium aluminate and potassium aluminate; alkali metal aldonates such as sodium gluconate and potassium gluconate; and alkali metal hydrogenphosphates such as dibasic sodium phosphate, dibasic potassium phosphate, monobasic sodium phosphate and monobasic potassium phosphate. Of solutions of these alkalis, a solution of a caustic alkali and a solution containing both caustic alkali and alkali metal aluminate are preferable from the viewpoint of rapid etching speed and low cost. Particularly preferable is an aqueous solution of a caustic soda.

In the first alkali etching treatment, the concentration of the alkaline solution is preferably 30 g/L or more and more preferably 300 g/L or more, and at the same time, preferably 500 g/L or less and more preferably 450 g/L or less.

Preferably the alkaline solution contains aluminum ions. The concentration of the aluminum ions is preferably 1 g/L or more and more preferably 50 g/L or more, and at the same time, preferably 200 g/L or less and more preferably 150 g/L or less. Such an alkaline solution can be prepared using, for example, water, an aqueous solution of 48% by mass caustic soda and sodium aluminate.

In the first alkali etching treatment, the temperature of the alkaline solution is preferably 30° C. or higher and more preferably 50° C. or higher, and at the same time, preferably 80° C. or lower and more preferably 75° C. or lower.

In the first alkali etching treatment, the treatment time is preferably 1 second or more and more preferably 2 seconds or more, and at the same time, preferably 30 seconds or less and more preferably 15 seconds or less.

As the etching treatment is continuously performed on the aluminum sheet, the concentration of the aluminum ions is increased in the alkaline solution; as a result, the etching amount of the aluminum sheet undergoes changes. So, it is preferable to control the composition of the etching solution in the following manner.

First, a matrix of electrical conductance, specific gravity and temperature or a matrix of electrical conductance, ultrasonic propagation speed and temperature is prepared which corresponds to the matrix of the caustic soda concentration and the aluminum ion concentration, the composition of the solution is determined by the electrical conductance, specific gravity and temperature or the electrical conductance, ultrasonic propagation speed and temperature, and then caustic soda and water are added so that the target value of the composition of the solution is obtained. The amount of the etching solution is kept constant by allowing the etching solution to overflow the circulation tank in amounts increased by the addition of caustic soda and water. As the caustic soda to be added, 40 to 60% by mass commercial caustic soda can be used.

As an electrical conductance meter and a specific gravity hydrometer, those compensating for temperature are preferably used. As a specific gravity hydrometer, differential pressure-type one is preferably used.

Methods for bringing the aluminum sheet into contact with an alkaline solution include: for example, methods in which the aluminum sheet is passed through an alkaline solution-containing bath, in which the aluminum sheet is dipped into an alkaline solution-containing bath and in which an alkaline solution is sprayed on the aluminum sheet.

After completing the alkali etching treatment, preferably the aluminum sheet is drained with nip rollers, rinsed for 1 to 10 seconds, and again drained with nip rollers.

Preferably, rinsing is performed first using an apparatus which performs rinsing with free falling curtain-like liquid film, and then using a spray tube.

<First Desmutting>

After the first alkali etching treatment, pickling (first desmutting) is preferably conducted for removing the smut remaining on the surface of the aluminum sheet. The desmutting is done by bringing the aluminum sheet into contact with an acidic solution.

Acids applicable to the treatment include: for example, nitric acid, sulfuric acid, phosphoric acid, chromic acid, hydrofluoric acid and hydrofluoboric acid.

When nitric acid electrolysis is subsequently conducted as a first electrolysis treatment, it is preferable, in the first desmutting performed after the first alkali etching treatment, to use the overflowing waste of an electrolytic solution to be used in the nitric acid electrolysis.

The composition of the desmutting solution can be controlled by selecting one of the methods: in which a matrix of electrical conductance and temperature which corresponds to the matrix of the acidic solution concentration and the aluminum ion concentration is used; in which a matrix of electrical conductance, specific gravity and temperature is used; and in which a matrix of electrical conductance, ultrasonic propagation speed and temperature is used, like the case of the alkali etching treatment.

In the first desmutting, preferably used is an acidic solution that contains an acid and aluminum ions at concentrations of 1 to 400 g/L and 0.1 to 5 g/L, respectively.

The temperature of the acidic solution is preferably 20° C. or higher and more preferably 30° C. or higher, and at the same time, preferably 70° C. or lower and more preferably 60° C. or lower.

In the first desmutting, the treatment time is preferably 1 second or more and more preferably 4 seconds or more, and at the same time, preferably 60 seconds or less and more preferably 40 seconds or less.

Methods for bringing the aluminum sheet into contact with an acidic solution include: for example, methods in which the aluminum sheet is passed through an acidic solution-containing bath, in which the aluminum sheet is dipped into an acidic solution-containing bath and in which an acidic solution is sprayed on the aluminum sheet.

After completing the desmutting, preferably the aluminum sheet is drained with nip rollers, rinsed for 1 to 10 seconds, and again drained with nip rollers.

The rinsing is performed in the same manner as the rinsing after the alkali etching treatment. However, the amount of water used per one spray tip is preferably 1 to 20 L/min.

When using the overflowing waste of the electrolytic solution, which is to be used in the subsequent nitric acid electrolysis, as the desmutting solution in the first desmutting, preferably the aluminum sheet does not undergo draining with nip rollers and rinsing after the desmutting, but undergoes handling until the subsequent nitric acid electrolysis while its surface is sprayed with the desmutting solution appropriately depending on the situation so that the surface of the aluminum sheet is not dried.

<First Electrolysis Treatment>

The first electrolysis treatment is first electrochemical roughening treatment performed in an aqueous solution containing nitric acid or hydrochloric acid.

As shown in roughening treatment embodiments 1, 4 and 5, performing the first and second electrolysis treatment makes it possible to form on the surface of the aluminum sheet a grained pattern in which highly uniform concavo-convex structures are superposed, and the use of such an aluminum sheet can provide a lithographic plate excellent in resistance to stains and plate wear.

The mean roughness of the surface of the aluminum sheet after the first electrolysis treatment is preferably 0.45 to 0.85 μm.

In roughening treatment embodiments 2 and 3, electrolytic roughening using nitric acid and electrolytic roughening using hydrochloric acid are performed, respectively. In roughening treatment embodiment 4, hydrochloric electrolysis is followed by nitric acid electrolysis. And in roughening treatment embodiment 5, hydrochloric electrolysis is performed twice. In the following, the present invention will be described in terms mainly of roughening treatment embodiment 1. However, it is to be understood that in the other embodiments, the conditions under which roughening treatment is performed can be changed depending on the characteristics of the respective embodiments.

(Electrochemical Roughening Treatment in Nitric Acid-containing Aqueous Solution)

Electrochemical roughening treatment in a nitric acid-containing aqueous solution (nitric acid electrolysis) enables the formation of preferable concavo-convex structures on the surface of the aluminum sheet. In the present invention, when the aluminum sheet contains a relatively large amount of Cu, relatively large and uniform concave portions are formed by the nitric acid electrolysis. As a result, a lithographic plate produced using a substrate for a lithographic plate obtained by the present invention has excellent plate wear.

As the nitric acid-containing aqueous solution, any nitric acid-containing aqueous solutions can be used which are used in ordinary electrochemical roughening treatment performed using direct current or alternating current. The nitric acid-containing aqueous solution can be prepared by adding at least one nitric compound containing nitric acid ions, such as aluminum nitrate, sodium nitrate and ammonium nitrate, to a 100 g/L solution of nitric acid in water in amounts ranging from 1 g/L up to a maximum that saturates the solution. Metals contained in aluminum alloys, such as iron, copper, manganese, nickel, titanium, magnesium or silica, may be dissolved in the nitric acid-containing aqueous solution. Hypochlorous acid or hydrogen peroxide may be added to the aqueous solution in amounts of 1 to 100 g/L.

Specifically, a solution is preferable which is prepared by dissolving aluminum nitrate in a 5 to 15 g/L solution of nitric acid in water so that the concentration of aluminum ions is 3 to 7 g/L.

The temperature of the nitric acid-containing aqueous solution is preferably 30° C. or higher and 55° C. or lower.

The nitric acid electrolysis makes possible the formation of pits with average aperture size of 1 to 10 μm. However, when a relatively larger amount of electricity is used, electrolytic reaction can sometimes be concentrated to produce honeycomb pits with average aperture size of more than 10 μm.

To achieve such graining, the sum of the electricity, at the time of completing electrolytic reaction, which is involved in the anodic reaction of the aluminum sheet is preferably 150 C/dm² or more and more preferably 170 C/dm² or more, and at the same time, preferably 600 C/dm² or less and more preferably 500 C/dm² or less. The current density in terms of peak value is preferably 20 to 100 A/dm², when employing alternating current, and preferably 20 to 100 A/dm², when employing direct current.

(Electrochemical Roughening Treatment in Hydrochloric Acid-containing Aqueous Solution)

As the hydrochloric acid-containing aqueous solution, any hydrochloric acid-containing aqueous solutions can be used which are used in ordinary electrochemical roughening treatment performed using direct current or alternating current. The hydrochloric acid-containing aqueous solution can be prepared by adding one or more hydrochloric compound containing hydrochloric acid ions, such as aluminum chloride, sodium chloride and ammonium chloride, or nitric compound containing nitric acid ions, such as aluminum nitrate, sodium nitrate and ammonium nitrate, to a 1 to 30 g/L solution of, preferably 2 to 10 g/L solution of hydrochloric acid in water in amounts ranging from 1 g/L up to a maximum that saturates the solution. The above described compounds, which form complexes with copper, can also be added to the solution in amounts of 1 to 200 g/L. Metals contained in aluminum alloys, such as iron, copper, manganese, nickel, titanium, magnesium or silica, may be dissolved in the hydrochloric acid-containing aqueous solution. Hypochlorous acid or hydrogen peroxide may be added to the aqueous solution in amounts of 1 to 100 g/L.

Specifically, a solution is preferable which is prepared by dissolving an aluminum salt (aluminum chloride, $AlCl_3 \cdot 6H_2O$) in a 2 to 10 g/L solution of hydrochloric acid in water in amounts of 27 to 63 g/L so that the concentration of aluminum ions is 3 to 7 g/L and preferably 4 to 6 g/L. Electrochemical roughening treatment using such an aqueous solution of hydrochloric acid makes it possible to provide uniform surface geometry to the aluminum sheet, prevent treatment non-uniformity from occurring in the aluminum sheet regardless of whether the aluminum rolled sheet is of low purity or high purity, and when using such an aluminum sheet to produce a lithographic plate, the resultant lithographic plate excels in both plate wear and resistance to stains.

The temperature of the hydrochloric acid-containing aqueous solution is preferably 25° C. or higher and more preferably 30° C. or higher, and at the same time, preferably 55° C. or lower and more preferably 40° C. or lower.

As the additives used in the hydrochloric acid-containing aqueous solution and the apparatus, power source, current density, flow rate and temperature employed in the electrochemical roughening treatment, any ones used in known electrochemical roughening treatment can be used. As the power source, an alternating power source is particularly preferably used, though any one of alternating and direct power sources can be used.

In the first hydrochloric acid electrolysis, if the sum of the electricity involved in the anodic reaction of the aluminum sheet is made as large as 150 to 2000 C/dm², large crater-like undulations can also be formed. Even in this case, pits with average aperture size of 1 to 15 μm which have minute concaves or convexes with average aperture size of 0.01 to 0.4 μm on their surface are also formed. The current density in terms of peak value is preferably 20 to 100 A/dm².

Subjecting the aluminum sheet to hydrochloric acid electrolysis using the above described large amount of electricity makes it possible to form large undulations and minute concaves or convexes at the same time. If the large undulations are made more uniform by the second alkali etching treatment described later, a lithographic plate produced using such an aluminum sheet can have further enhanced resistance to stains.

Figure 3:
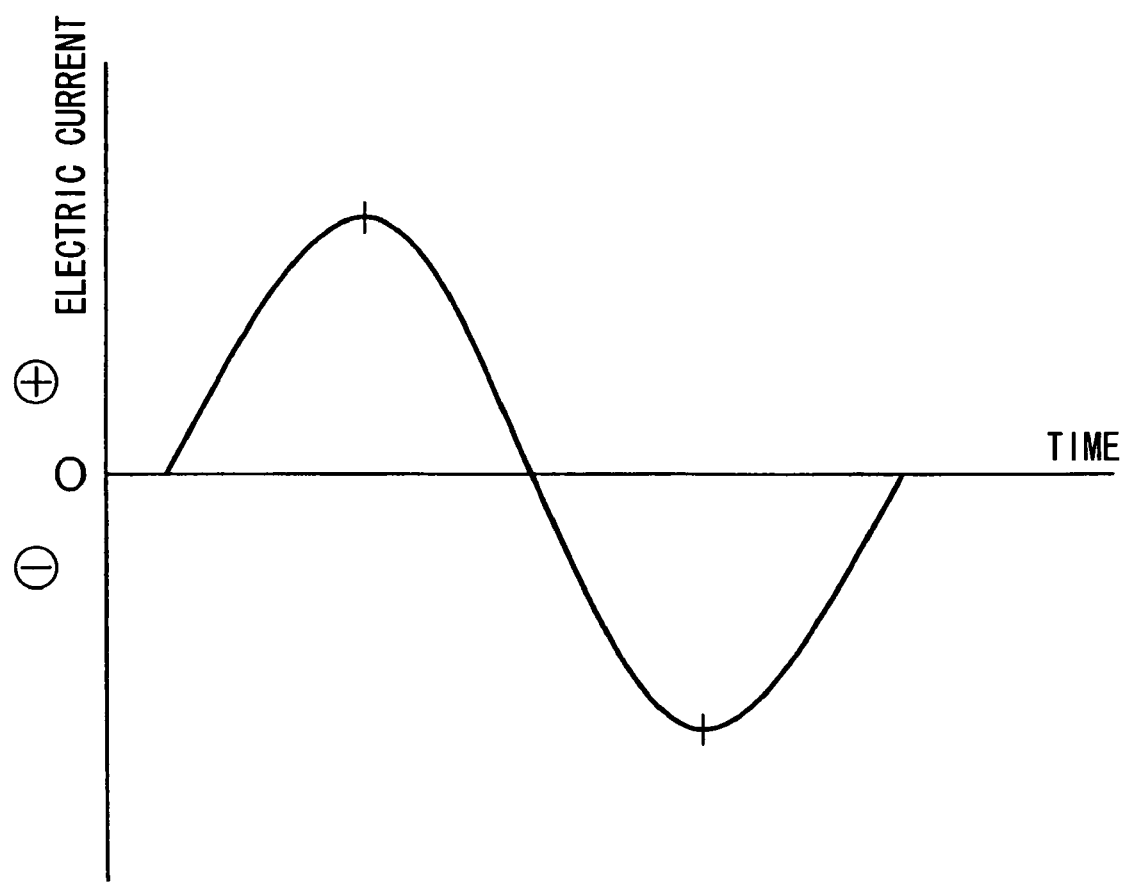
FIG. 3 is a graph showing one example of sine waveform used in the electrochemical roughening treatment in the method for producing a substrate for a lithographic plate in accordance with the present invention.

The alternating waveform used in the electrochemical roughening treatment is not limited to any specific one, and any of sine, rectangular, trapezoidal and triangle waves can be used. Preferable is a sine wave, rectangular wave or trapezoidal wave and particularly preferable is a trapezoidal wave. In the case of the first hydrochloric acid electrolysis, a sine wave is particularly preferable because pits with average aperture size of 1 μm or more are easy to uniformly generate. "Sine wave" indicates a wave as shown in FIG. 3.

Figure 4:
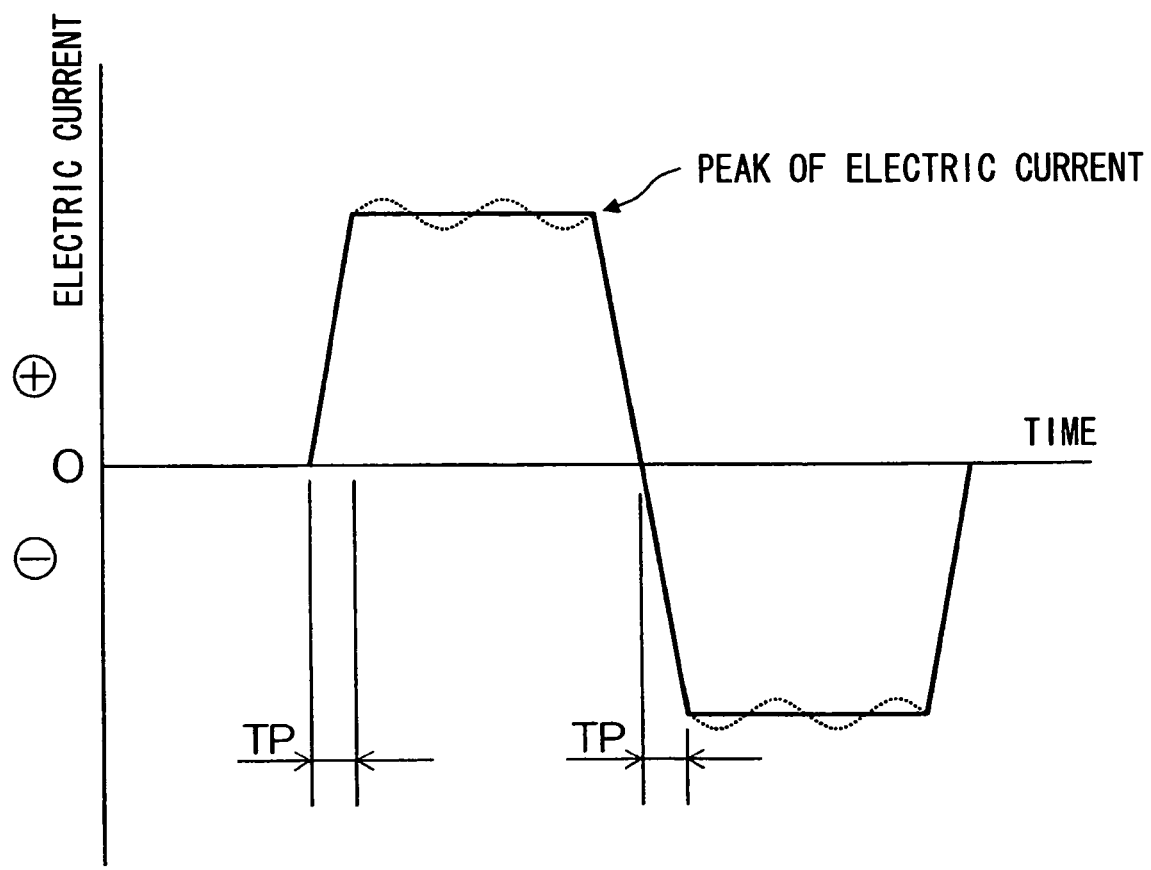
FIG. 4 is a graph showing one example of alternating current waveform used in the electrochemical roughening treatment in the method for producing a substrate for a lithographic plate in accordance with the present invention.

"Trapezoidal wave" indicates a wave as shown in FIG. 4. In this trapezoidal wave, the time (TP) the current takes to reach a peak from 0 is preferably 0.5 to 3 msec. If TP is more than 3 msec, the surface of the aluminum sheet is more likely to be affected by the small amount of components in the electrolytic solution, represented by ammonium ions whose amount spontaneously increases by the electrolysis treatment, whereby uniform graining becomes hard to accomplish. As a result, when using the aluminum sheet to produce a lithographic plate, the resultant lithographic plate tends to be poor in resistance to stains.

Alternating current of a duty cycle (ta/T, the ratio of the anodic reaction time to time for 1 cycle) 1:2 to 2:1 is applicable. However, as described in Japanese Patent Application Laid-open No. 5-195300, in indirect feeding which uses no conductor roll for aluminum, alternating current of a duty cycle 1:1 is preferable.

Alternating current of a frequency 0.1 to 120 Hz is applicable; however, from the viewpoint of equipment, alternating current of a frequency 50 to 70 Hz is preferable. If the frequency is less than 50 Hz, the carbon electrode as a main electrode is likely to dissolve, whereas if the frequency is higher than 70 Hz, alternating current is more likely to be affected by the inductance component on the power circuit, resulting in high power cost.

The average aperture size of the concave portions produced by the first electrolysis treatment is determined by, for example, taking photographs of the top surface of a substrate at ×2000 and ×50000 magnification with an electron microscope, picking out at least 50 pits whose periphery is ring-shaped from among the pits produced by the electrolysis treatment in the respective photographs, reading the size of each pit as an aperture size, and calculating the average aperture size.

To control the variations in measurement, commercially available image-analysis software can be used to determine the equivalent diameter. In this case, the above described electron micrographs are scanned by a scanner to be digitized, the digitized data is binarized by the software, and the diameter of the equivalent circles is obtained.

The measurements by the present inventors confirmed that the result of visual measurement and that of digital processing were almost the same.

After completing the first electrolysis treatment, preferably the aluminum sheet is drained with nip rollers, rinsed with water for 1 to 10 seconds and again drained with nip rollers.

Preferably the rinsing was performed using spray tubes. Spray tubes applicable are, for example, those having a plurality of spray tips, from which sprayed water spouts out in the form of a fan, across the width. The spacing between the spray tips is preferably 20 to 100 mm and the amount of water sprayed per spray tip is preferably 1 to 20 L/min. Preferably a plurality of spray tubes are used.

<Second Alkali Etching Treatment>

The second alkali etching treatment performed between the first electrolysis treatment and the second electrolysis treatment is intended to dissolve the smut formed by the first electrolysis treatment and the edge portions of the pits formed by the first electrolysis treatment. This treatment dissolves the edge portions of the large pits formed by the first electrolysis treatment, which makes the surface of the aluminum sheet smooth and makes ink hard to be caught by the edge portions. And when using such aluminum sheet to produce a lithographic plate, the resultant original lithographic plate has excellent resistance to stains.

Since the second alkali etching treatment is basically the same as the first alkali etching treatment, the different points alone will be described below.

In the second alkali etching treatment, the etching amount is preferably 0.05 $g/m^2$ or more and more preferably 0.1 $g/m^2$ or more, and at the same time, it is preferably 4 $g/m^2$ or less and more preferably 3.5 $g/m^2$ or less. If the etching amount is 0.05 $g/m^2$ or more, in the non-image area of the lithographic plate, the edge portions of the pits formed by the first electrolysis treatment is leveled. This makes ink less likely to be caught in the edge portions, thereby enhancing the resistance to stains of the lithographic plate. If the etching amount is 4 $g/m^2$ or less, the concaves or convexes formed by the first electrolysis treatment become large, thereby enhancing the plate wear of the lithographic plate.

In the second alkali etching treatment, the concentration of the alkaline solution is preferably 30 g/L or more and more preferably 300 g/L or more, and at the same time, preferably 500 g/L or less and more preferably 450 g/L or less.

Preferably the alkaline solution contains aluminum ions. The concentration of the aluminum ions is preferably 1 g/L or more and more preferably 50 g/L or more, and at the same time, preferably 200 g/L or less and more preferably 150 g/L or less.

<Second Desmutting>

After the second alkali etching treatment, pickling (second desmutting) is preferably conducted for removing the smut remaining on the surface of the aluminum sheet. The second desmutting can be performed in the same manner as the first desmutting.

In the second desmutting, preferably nitric acid or sulfuric acid is used.

In the second desmutting, an acidic solution is preferably used which contains an acid at a concentration of 1 to 400 g/L and aluminum ions at a concentration of 0.1 to 8 g/L.

When using sulfuric acid, a solution can be used which is prepared by dissolving aluminum sulfate in a 100 to 350 g/L solution of sulfuric acid in water so that the concentration of aluminum ions is 0.1 to 5 g/L. The overflowing waste of an electrolytic solution to be used in the anodization described later can also be used.

In the second desmutting, the treatment time is preferably 1 second or more and more preferably 4 seconds or more, and at the same time, preferably 60 seconds or less and more preferably 20 seconds or less.

In the second desmutting, the temperature of the acidic solution is preferably 20° C. or higher and more preferably 30° C. or higher, and at the same time, preferably 70° C. or lower and more preferably 60° C. or lower.

<Second Electrolysis Treatment>

For example, in roughening treatment embodiments 1, 5, the second electrolysis treatment is electrochemical roughening treatment performed in an aqueous solution containing hydrochloric acid using alternating or direct current. In the present invention, a complex concavo-convex structure can be formed on the surface of the aluminum sheet by combining the above described first electrolysis treatment with the second electrolysis treatment; as a result, when using such an aluminum sheet to produce a lithographic plate, the resultant lithographic plate has excellent plate wear. Further, the second electrolysis treatment can form concave portions of 0.01 to 0.4 μm in average diameter on the surface of the aluminum sheet having been leveled by the second alkali etching treatment. This contributes to enhancing the plate wear of the lithographic plate produced using such an aluminum sheet.

The second hydrochloric acid electrolysis performed after the first electrolysis treatment is basically the same as the first hydrochloric acid electrolysis described above.

In the second hydrochloric acid electrolysis, the sum of the electricity involved in the anodic reaction of the aluminum sheet in the electrochemical roughening treatment performed in an aqueous solution containing hydrochloric acid is in the range of 10 to 200 $C/dm^2$, preferably 10 to 100 $C/dm^2$ and particularly preferably 50 to 80 $C/dm^2$ at the time of completing the electrochemical roughening treatment.

When performing the first hydrochloric acid electrolysis as a first electrolysis treatment, preferably the sum of the electricity $Q1$ involved in the anodic reaction at the time of completing the electrolytic reaction in the first hydrochloric acid electrolysis is larger than the sum of the electricity $Q2$ involved in the anodic reaction at the time of completing the electrolytic reaction in the second hydrochloric acid electrolysis ($Q1>Q2$). Doing this allows the surface area of the aluminum sheet to be increased, thanks to the pits 1 to 15 μm in average aperture diameter formed by the first hydrochloric electrolysis. As a result, the adhesion of the aluminum sheet to an imaging layer, which is to be provided on the aluminum sheet, is enhanced. And when using such an aluminum sheet to produce a lithographic plate, the resultant lithographic plate has excellent plat wear.

<Third Alkaline Etching Treatment>

The third alkali etching treatment performed after the second electrolysis treatment is intended to dissolve the smut formed by the second electrolysis treatment and the edge portions of the pits formed by the second electrolysis treatment. Since the third alkali etching treatment is basically the same as the first alkali etching treatment, the different points alone will be described below.

In the third alkali etching treatment, the etching amount is preferably 0.05 $g/m^2$ or more and more preferably 0.1 $g/m^2$ or more, and at the same time, it is preferably 0.3 $g/m^2$ or less and more preferably 0.25 $g/m^2$ or less. If the etching amount is 0.05 $g/m^2$ or more, in the non-image area of the lithographic plate, the edge portions of the pits formed by the second hydrochloric electrolysis is leveled. This makes ink less likely to be caught in the edge portions, thereby enhancing the resistance to stains of the lithographic plate. If the etching amount is 0.3 $g/m^2$ or less, the concaves or convexes formed by the first and the second hydrochloric electrolysis treatment become large, thereby enhancing the plate wear of the lithographic plate.

In the third alkali etching treatment, the concentration of the alkaline solution is preferably 30 g/L or more, and not to excessively minimize concaves or convexes formed by the hydrochloric acid alternating electrolysis in the previous step, the concentration is preferably 100 g/L or less and more preferably 70 g/L or less.

Preferably the alkaline solution contains aluminum ions. The concentration of the aluminum ions is preferably 1 g/L or more and more preferably 3 g/L or more, and at the same time, preferably 50 g/L or less and more preferably 8 g/L or less. Such an alkaline solution can be prepared using, for example, water, a 48% by mass solution of caustic soda in water and sodium aluminate.

In the third alkali etching treatment, the temperature of the alkaline solution is preferably 25° C. or higher and more preferably 30° C. or higher, and at the same time, it is preferably 60° C. or lower and more preferably 50° C. or lower.

In the third alkali etching treatment, the treatment time is preferably 1 second or more and more preferably 2 seconds more, and at the same time, it is preferably 30 seconds or less and more preferably 10 seconds or less.

<Third Desmutting>

After the third alkali etching treatment, pickling (third desmutting) is preferably conducted for removing the smut remaining on the surface of the aluminum sheet. Since the third desmutting is basically the same as the first desmutting, different points alone will be described below.

In the third desmutting, the same kind of electrolytic solution (e.g. sulfuric acid) as that used in the subsequent anodizing treatment is preferably used, because this makes it possible to omit the rinsing step between the third desmutting and the subsequent anodizing.

In the third desmutting, an acidic solution is preferably used which contains an acid at a concentration of 5 to 400 g/L and aluminum ions at a concentration of 0.5 to 8 g/L. When using sulfuric acid, a solution can be preferably used which is prepared by dissolving aluminum sulfate in a 100 to 350 g/L solution of sulfuric acid in water so that the concentration of aluminum ions is 1 to 5 g/L.

In the third desmutting, the treatment time is preferably 1 second or more and more preferably 4 seconds or more, and at the same time, preferably 60 seconds or less and more preferably 15 seconds or less.

In the third desmutting, when using, as a desmutting solution, the same kind of electrolytic solution as that used in the subsequent anodizing treatment, the operations such as draining with nip rollers and rinsing can be omitted after the desmutting.

<Anodizing>

The aluminum sheet thus treated is further subjected to anodizing. Anodizing can be performed by any methods conventionally used in this field. In this case, the aluminum sheet is placed as an anode in a solution that contains sulfuric acid at a concentration of 50 to 300 g/L and aluminum at a concentration of 5% by mass or less and energized so as to produce an anodic oxidation coating formed on it. As the solution for the anodizing, sulfuric acid, phosphoric acid, chromic acid, oxalic acid, sulfamic acid, benzenesulfonic acid or amidosulfonic acid can be used alone or in combination.

The electrolytic solution used in this treatment may contain at least components that are normally contained in the aluminum sheet, the electrode, city water or groundwater. It may also contain the second and the third components. The second and the third components herein used include; for example, metal ions such as Na, K, Mg, Li, Ca, Ti, Al, V, Cr, Mn, Fe, Co, Ni, Cu and Zn; cations such as ammonium ion; and anions such as nitric acid ion, carbonic acid ion, chloride ion, phosphoric acid ion, fluoride ion, sulfurous acid ion, titanic acid ion, silicic acid ion and boric acid ion. They may be contained at concentrations of 0 to 10000 ppm.

The conditions under which anodizing is performed cannot be determined in a wholesale manner, because they vary depending on the electrolytic solution used. However, typically, appropriate conditions are as follows: the concentration of the electrolytic solution is 1 to 80% by mass, the temperature of the solution is 5 to 70° C., the current density is 0.5 to 60 A/dm$^2$, the voltage is 1 to 100 V and the electrolysis time is 15 seconds to 50 minutes. They are adjusted so that a desired amount of anodic oxidation coating is obtained.

As described in Japanese Patent Application Laid-open Nos. 54-12853 and 48-45303, as an electrolytic solution, sulfuric acid solution is preferably used. The concentration of sulfuric acid in the electrolytic solution is preferably 10 to 300 g/L (1 to 30% by mass) and more preferably 50 to 200 g/L (5 to 20% by mass), whereas the concentration of aluminum ion is preferably 1 to 25 g/L (0.1 to 2.5% by mass) and more preferably 2 to 10 g/L (0.2 to 1% by mass). Such an electrolytic solution can be prepared, for example, by adding aluminum sulfate to a dilute sulfuric acid at a concentration of 50 to 200 g/L.

Preferably, the composition of the electrolytic solution is controlled in the same manner as in the case of nitric acid electrolysis—that is, it is controlled by a matrix of electrical conductance, specific gravity and temperature, or a matrix of electrical conductance, ultrasonic propagation speed and temperature which corresponds to the matrix of the sulfuric acid concentration and the aluminum ion concentration.

The temperature of the electrolytic solution is preferably 25 to 55° C. and more preferably 30 to 50° C.

When performing anodization in an electrolytic solution containing sulfuric acid, direct current may be applied between the aluminum sheet and the counter electrode. Alternating current can also be applied.

When direct current is applied to the aluminum sheet, preferably the current density is 1 to 60 A/dm$^2$ and more preferably 5 to 40 A/dm$^2$.

When performing anodization continuously, it is preferable to allow current to flow at a current density of as low as 5 to 10 A/m$^2$ at the beginning of the anodization and gradually increase the current density up to 30 to 50 A/dm$^2$ or more as the anodization progresses, so that what is called "burning" (making a portion of anodic oxidation coating thicker than its surroundings) should not occur due to the current concentration on some spot of the aluminum sheet.

More specifically, it is preferable to distribute the current of a direct current source so that the current is larger on the downstream surface than on the upstream surface. Such a current distribution makes burning less likely to occur; as a result, anodization at high speeds is made possible.

When performing anodization continuously, it is preferable to employ a liquid contact current supply process whereby electric feeding to the aluminum sheet is via an electrolyte solution.

Performing anodization under such conditions makes it possible to obtain a porous oxide coating having a number of pores (micropores). Typically the average pore diameter is about 5 to 50 nm and the average pore density is about 300 to 800 μm$^2$.

The amount of anodic oxide coating is preferably 1 to 5 g/m$^2$. If it is less than 1 g/m$^2$, flows are more likely to occur in the plate, whereas if it is more than 5 g/m$^2$, the production of a plate requires a large amount of electric power, which is disadvantageous in terms of economy. The amount of anodic oxide coating is more preferably 1.5 to 4 g/m². Preferably, anodization is performed so that the difference in the amount of the anodic oxide coating between the central portion and the edge portion of the aluminum sheet is 1 g/m² or less.

<Sealing Treatment>

In the present invention, sealing treatment for sealing micropores existing in the anodic oxidation coating may be performed depending on the situation. Performing sealing treatment after anodization enables the production of an original form for a lithographic plate having good developability (sensitivity).

It is well known that anodic oxide coatings are porous coatings having fine holes, called pores, almost perpendicular to their surface. In the present invention, it is particularly preferable to provide sealing treatment to the porous coating at a high sealing rate. The sealing rate is preferably 50% or more, more preferably 70% or more and much more preferably 90% or more. The sealing rate (%) herein used is defined by the following equation.

Sealing rate=100×(surface area before sealing−surface area after sealing)/surface area before sealing The surface area described above is measured by a simplified BET method using QUANTASORB (manufactured by Yuasa Ionics Inc.).

Subjecting the anodized aluminum sheet to treatment such as sealing and hydrophilization enables the production of a more preferable aluminum substrate for a lithographic plate.

In sealing treatment using an alkaline metal silicate, sealing can be carried out using an aqueous solution of an alkaline metal silicate whose pH is 10 to 13 at 25° C., at which neither gelation of the solution nor dissolution of the anodic oxide occurs, while appropriately selecting treatment conditions such as concentration of the alkaline metal silicate, and temperature and time of treatment. Suitable alkaline metal silicates include: for example, sodium silicate, potassium silicate and lithium silicate. To adjust the pH of the aqueous solution of an alkaline metal silicate to a higher value, sodium hydroxide, potassium hydroxide or lithium hydroxide can be mixed into the solution.

After the sealing treatment, the aluminum sheet can also undergo surface treatment, depending on the situation, such as treatment in which the aluminum sheet is dipped into an aqueous solution of alkali silicate such as sodium silicate, treatment in which the aluminum sheet is dipped into a solution that contains polymer or copolymer having a polyvinyl phosphonic acid, polyacrylic acid or sulfonic acid group on its surface chain or into a solution that contains an organic compound having (a) an amino group and (b) a group selected from the group consisting of phosphine, phosphone and phosphoric acid groups or the salt thereof described in Japanese Patent Application Laid-open No. 11-231509, or treatment in which the aluminum sheet is primed with such a solution.

The hydrophilic binder polymer used in the hydrophilic layer of the present invention is a synthetic homopolymer or copolymer, such as polyvinyl alcohol, poly(meth)acrylic acid, poly(meth)acrylamide, polyhydroxy ethyl (meth)acrylate or polyvinyl methyl ether, or a naturally occurring polymer, such as gelatin or polysaccharide such as dextran, pullulan, cellulose, Arabic gum or alginic acid.

<Hydrophilization Treatment>

After an anodization or sealing treatment, a hydrophilization treatment may be performed. Examples of hydrophilization treatments include: a treatment with potassium fluozirconate described in U.S. Pat. No. 2,946,638; a treatment with phosphomolibdate described in U.S. Pat. No. 3,201, 247; a treatment with alkyl titanate described in G.B. Patent No. 1,108,559; a treatment with polyacrylic acid described in G. Patent No. 1,091,433; a treatment with polyvinyl phosphonate described in G. Patent No. 1,134,093 and G.B. Patent No. 1,230,447; a treatment with phosphonic acid described in Japanese Examined Application Publication No. 44-6409; a treatment with phytate described in U.S. Pat. No. 3,307,951; a treatment with a salt of a lipophilic organic polymer and divalent metal described in Japanese Patent Application Laid-open Nos. 58-16893 and 58-18291; a treatment which provides a substrate of hydrophilic cellulose (e.g. carboxymethyl cellulose) that contains water-soluble metal salt (e.g. zinc acetate) as described in U.S. Pat. No. 3,860,426; and a treatment which primes a water-soluble polymer having a sulfo group described in Japanese Patent Application Laid-open No. 59-101651.

The hydrophilization treatment with an aqueous solution of an alkali metal silicate such as sodium silicate or potassium silicate can be performed in accordance with the methods and procedures described in U.S. Pat. Nos. 2,714, 066 and 3,181,461.

The amount of Si adsorbed on the aluminum sheet by the treatment with an alkali metal silicate can be measured with a fluorescent X-ray analyzer. The amount is preferably 1.0 to 15.0 mg/m².

The treatment with an alkali metal silicate produces the effect of improving the resistance to solubility of the surface of the substrate for a lithographic plate in the alkali developer solution, thereby inhibiting the elution of the aluminum component in the developer solution. This enables the decrease in the amount of developer sediment caused by the fatigue of the developer solution.

The hydrophilization treatment which forms a hydrophilic substrate on the surface of the aluminum sheet can be performed under the conditions and by the procedures described in Japanese Patent Application Laid-open Nos. 59-101651 and 60-149491.

<Drying>

After producing a substrate for a lithographic plate as described above, preferably the surface of the substrate for a lithographic plate is dried before provided with an imaging layer. Preferably the drying operation is performed after subjecting the aluminum sheet having undergone the final surface treatment to rinsing and draining with nip rollers.

The drying temperature is preferably 70° C. or higher and more preferably 80° C. or higher, and at the same time, it is preferably 110° C. or lower and more preferably 100° C. or lower. The drying time is preferably 1 second or more and more preferably 2 second or more, and at the same time, it is preferably 20 second or less and more preferably 15 second or less.

<Control of Solution Composition>

In the present invention, preferably the composition of the treatment solutions used in the above described surface treatment is controlled by the method described in Japanese Patent Application Laid-open No. 2001-121837. Preferably, the concentration of each solution is controlled based on the data obtained as follows. First, a data table in matrix is prepared in advance by preparing a number of samples with different concentrations for each of the treatment solutions and measuring the propagation speed of ultrasonic in each sample solution at two different temperatures. Then, the temperature of each solution and the propagation speed of ultrasonic in each solution are measured in real time during each treatment. Particularly when using in a desmutting an electrolyte solution whose sulfuric acid concentration is 250 g/L or more, it is preferable to control the concentration by the above described method.

In each of the electrolyte solutions used in electrolytic roughening treatment and anodization, the concentration of Cu is preferably 100 ppm or less. If the concentration of Cu is too high, when stopping the treatment line, Cu is deposited on the aluminum sheet, and when starting the operation of the line again, the deposited Cu is transferred to the pass roll, which may result in treatment non-uniformity.

Performing a hydrophilization treatment after sealing treatment is more preferable.

[Original Lithographic Plate]

The substrate for a lithographic plate obtained by the present invention can be formed into an original lithographic plate of the present invention by providing it with an imaging layer. For the imaging layer, a photosensitive composition is used.

Examples of photosensitive compositions suitably used in the present invention include: thermal positive photosensitive compositions that contain an alkali-soluble polymer and a light-heat converting material (hereinafter such compositions and the imaging layer using the same are referred to as "thermal-positive type"); thermal negative photosensitive compositions that contain a curable composition and a light-heat converting material (hereinafter such compositions and the imaging layer using the same are referred to as "thermal-negative type"); photopolymerizable photosensitive compositions (hereinafter such compositions and the imaging layer using the same are referred to as "photopolymer type"); negative type of photosensitive compositions that contain a diazo resin or a photo-crosslinkable resin (hereinafter such compositions and the imaging layer using the same are referred to as "conventional negative type"); positive type of photosensitive compositions that contain a quinine-diazo compound (hereinafter such compositions and the imaging layer using the same are referred to as "conventional positive type"); and photosensitive compositions that do not require any special developing step (hereinafter such compositions and the imaging layer using the same are referred to as "untreated type"). In the following the photosensitive compositions of "thermal-positive type" will be described; however, it is to be understood that since this application is one related to forming the surface geometry of a substrate, the photosensitive compositions are not limited to "thermal-positive type" ones.

<Thermal-positive Type>

<Photosensitive Layer>

A thermal-positive type of photosensitive composition contains an alkali-soluble polymer and a light-heat converting material. In the thermal-positive type imaging layer, the light-heat converting material converts the energy of light, such as infrared laser light, into heat, and the heat efficiently eliminates the interaction that lowers the alkali-solubility of the alkali-soluble polymer.

Examples of alkali-soluble polymers include: resins that have an acid group per molecule; and the mixtures of two or more kinds thereof. From the viewpoint of solubility in alkali developers, resins that have an acid group such as phenolic hydroxyl group, sulfonamide group ($-SO_2NH-R$ (in the formula, R represents a hydrocarbon group)) or active imino group ($-SO_2NHCOR$, $-SO_2NHSO_2R$, $-CONHSO_2R$ (in each of the formulae, R represents a hydrocarbon group)) are particularly preferable.

Resins having a phenolic hydroxyl group are particularly preferable because they excel in image forming properties when exposed to light such as infrared laser light. Specific examples of such resins include: for example, novolak resins such as phenol formaldehyde resins, m-cresol-formaldehyde resins, p-cresol-formaldehyde resins, m-/p-mixed cresol-formaldehyde resins, and phenol/cresol (any one of m-, p- or m-/p-mixture) mixed-formaldehyde resins (phenol-cresol-formaldehyde copolycondensation resins).

Polymers described in Japanese Patent Application Laid-open No. 2001-305722 (particularly in columns [0023] to [0042]), polymers described in Japanese Patent Application Laid-open No. 2001-215693 that have a repeating unit expressed by the general formula (1) and polymers described in Japanese Patent Application Laid-open No. 2002-311570 (particularly in column [0107]) are also preferable.

As light-heat converting materials, pigments or dyes having their light absorption region in the infrared region of 700 to 1200 nm are preferable in terms of recording sensitivity. Examples of such dyes include: azo dyes, metal complex azo dyes, pyrazolone azo dyes, naphthoquinone dyes, anthraquinone dyes, phthalocyanine dyes, carbonium dyes, quinoneimine dyes, squalelium dyes, pyrylium salts and metal thiolate complexes (e.g. nickel thiolate complex). Of these dyes, cyanine dyes are preferable, and cyanine dyes described in Japanese Patent Application Laid-open No. 2001-305722 which are expressed by the general formula (1) are particularly preferable.

The thermal-positive type of photosensitive composition can contain a dissolution inhibitor. Preferable examples of dissolution inhibitors include those described in Japanese Patent Application Laid-open No. 2001-305722 in columns [0053] to [0055].

Preferably, the thermal-positive type of photosensitive composition contains additives such as sensitivity adjuster, heat-developing agent for obtaining visible image right after heat generation by exposure, compound as image coloring agent such as dye and surfactant for improving the coating properties and treatment stability. The compounds described in Japanese Patent Application Laid-open No. 2001-305722 in columns [0056] to [0060] are preferably used as such additives.

In addition to the photosensitive compositions described above, other photosensitive compositions described in detail in Japanese Patent Application Laid-open No. 2001-305722 are preferably used.

The type of the thermal-positive type of imaging layer is not limited to a single layer type, but it may be a two-layer type.

One preferable example of two-layer type of imaging layers (multilayer type of imaging layers) is a type in which a sublayer which excels in plate wear and resistance to solvents (hereinafter referred to as "layer A") is provided on the surface near the substrate and a layer which excels in posi-image forming properties (hereinafter referred to as "layer B") is provided on the sublayer. This type of imaging layer is highly sensitive and enables the realization of a wide range of development latitude. The layer B typically contains a light-heat converting material. Examples of light-heat converting materials preferably contained in the layer B include the above described dyes.

Examples of resins preferably used in the layer A include polymers that have a monomer having a group such as sulfonamide, active imide or phenolic hydroxyl group as a copolymerization component, because they excel in plate wear and resistance to solvents. Examples of resins preferably used in the layer B include alkaline aqueous solution-soluble resins that have a phenolic hydroxyl group.

The compositions used in the layer A and the layer B can contain the above described resins, and optional various additives. Specific examples of additives preferably used in the layers include those described in Japanese Patent Application Laid-open No. 2002-3233769 in columns [0062] to [0085]. Also, suitable additives are described in Japanese Patent Application Laid-open No. 2001-305722 cited above in columns [0053] to [0060].

The components that constitute the layer A and the layer B and the contents thereof are preferably those described in Japanese Patent Application Laid-open No. 11-218914.

<Intermediate Layer>

Preferably, an intermediate layer is provided between a thermal-positive type of imaging layer and a substrate. Preferable examples of components contained in the intermediate layer include various organic compounds described in Japanese Patent Application Laid-open No. 2001-305722 in columns [0068].

<Others>

As methods for producing a thermal-positive type of imaging layer and for making a plate, those described in detail in Japanese Patent Application Laid-open No. 2001-305722 can be used.

<Back Coat>

On the back surface of the original forms for lithographic plates in accordance with the present invention, which are obtained by providing various imaging layers on the substrates for lithographic plates obtained by the present invention as described above, a coating layer of an organic polymer can be provided so as to prevent the occurrence of scratches when the original forms are piled one on top of another.

[Plate Making Method (Method for Producing Lithographic Plate)]

An original form for a lithographic plate which uses a substrate for a lithographic plate obtained by the present invention is formed into a lithographic plate by various treatment methods depending on the imaging layer.

Examples of light sources used in image exposure include: mercury lamps, metal halide lamps, xenon lamps and chemical lamps. Examples of laser beams include: beams of helium-neon laser (He—Ne laser), argon laser, krypton laser, helium-cadmium laser, KrF excimer laser, semiconductor laser, YAG laser and YAG-SHG laser.

When the imaging layer is any one of thermal-positive type, thermal-negative type, conventional negative type, conventional positive type and photopolymer type, it is preferable to develop the imaging layer with a developer solution after the above exposure.

As a developer solution, an alkali developer solution is preferable, and an alkaline solution that substantially contains no organic solvent is more preferable.

A developer solution that substantially contains no alkali metal silicate is also preferable. As a method for the development using a developer solution that substantially contains no alkali metal silicate, one described in detail in Japanese Patent Application Laid-open No. 11-109637 can be used.

A developer solution that contains an alkali metal silicate can also be used.

EXAMPLES

In the following, the present invention will be described in detail by examples which are not intended to limit the present invention.

[1] Production of Embossing Rollers (Production of Embossing Roller A)

A heat curing-treated S45C core bar roller 20 cm in diameter and 12 cm in width was subjected to electrical discharge machining to produce an embossing roller A whose rolling surface (embossing form portion) had a concavo-convex pattern with an arithmetic mean roughness (Ra) of 0.3 μm and a mean spacing of profile irregularities (RSm) of 69 μm. The electrical discharge machining was carried out on an electrical discharge machine (type: die sinking electrical discharge machine EA8, by Mitsubishi Electric Corporation) by a negative ion-discharge type of capacitor discharging at 350 V using a kerosene working fluid, to which graphite particles 1.5 μm in average particle size had been added at a concentration of 3 g/L, and a copper electrode 0.5 mm thick. The hardness of the rolling surface was 300 Hv (Vickers hardness), which was lower than the lower limit of the hardness requirements, 500 to 1500 Hv (Vickers hardness), set for the preferable electrical discharge machining in the present invention.

(Production of Embossing Roller B)

The surface of a heat curing-treated S45C core bar roller 20 cm in diameter and 12 cm in width was hard chrome plated to obtain a hard chrome plated coating 50 μm thick. Then, the roller was subjected to electrical discharge machining under the same conditions as in the case of the embossing roller A to produce an embossing roller B whose rolling surface (embossing form portion) had a concavo-convex pattern with an arithmetic mean roughness (Ra) of 0.6 μm and a mean spacing of profile irregularities (RSm) of 16 μm was obtained. The hardness of the rolling surface was 900 Hv (Vickers hardness). The embossing roller B was so produced as to meet all the requirements of the preferred electrical discharge machining in the present invention.

(Production of Embossing Roller C)

The surface of a heat curing-treated S45C core bar roller 20 cm in diameter and 12 cm in width was KANIGEN plated (JAPAN KANIGEN Co., Ltd.) to obtain a plated coating 30 μm thick. Then, graphite particles 1.5 μm in average diameter was added to a kerosene working fluid in an amount of 3 g/L, and electrical discharge machining was carried out by a negative ion-discharge type of capacitor discharging at 350 V using a brass electrode 2 mm thick. Thus, an embossing roller C whose rolling surface (embossing form portion) had a concavo-convex pattern with an arithmetic mean roughness (Ra) of 0.4 μm and a mean spacing of profile irregularities (RSm) of 55 μm was obtained. The hardness of the rolling surface was 500 Hv (Vickers hardness). The embossing roller C was so produced as to meet all the requirements of the preferred electrical discharge machining in the present invention.

(Production of Embossing Roller D)

The surface of a heat curing-treated S45C core bar roller 20 cm in diameter and 12 cm in width was KANIGEN plated (JAPAN KANIGEN Co., Ltd.) to obtain a plated coating 30 μm thick, followed by heat treatment at 400° C. Then, graphite particles 1.5 μm in average diameter was added to a kerosene working fluid in an amount of 3 g/L, and electrical discharge machining was carried out by a negative ion-discharge type of capacitor discharging at 350 V using a brass electrode 2 mm thick. Thus, an embossing roller D whose rolling surface (embossing form portion) had a concavo-convex pattern with an arithmetic mean roughness (Ra) of 0.4 µm and a mean spacing of profile irregularities (RSm) of 50 µm was obtained. The hardness of the rolling surface was 900 Hv (Vickers hardness). The embossing roller D was so produced as to meet all the requirements of the preferred electrical discharge machining in the present invention.

(Production of Embossing Roller E)

The surface of a heat curing-treated S45C core bar roller 20 cm in diameter and 12 cm in width was KANIBORON plated (JAPAN KANIGEN Co., Ltd.) to obtain a plated coating 30 µm thick, followed by heat treatment at 400° C. Then, graphite particles 1.5 µm in average diameter was added to a kerosene working fluid in an amount of 3 g/L, and electrical discharge machining was carried out by a negative ion-discharge type of capacitor discharging at 350 V using a brass electrode 2 mm thick. Thus, an embossing roller E whose rolling surface (embossing form portion) had a concavo-convex pattern with an arithmetic mean roughness (Ra) of 0.5 µm and a mean spacing of profile irregularities (RSm) of 41 µm was obtained. The hardness of the rolling surface was 950 Hv (Vickers hardness). The embossing roller E was so produced as to meet all the requirements of the preferred electrical discharge machining in the present invention.

(Production of Embossing Roller F)

The surface of a heat curing-treated S45C core bar roller 20 cm in diameter and 12 cm in width was hard chrome plated to obtain a hard chrome plated coating 50 µm thick. Then, the roller was subjected to electrical discharge machining under the same conditions as in the case of the embossing roller B, except that the material for the electrode was changed to brass and, instead of the negative ion-discharge type of capacitor discharging, pulse discharging with pulse cycle time of 2 µs was performed by switching the power source. Thus, an embossing roller F whose rolling surface (embossing form portion) had a concavo-convex pattern with an arithmetic mean roughness (Ra) of 0.3 µm and a mean spacing of profile irregularities (RSm) of 96 µm was obtained. The hardness of the rolling surface was 900 Hv (Vickers hardness). The embossing roller F was so produced as not to meet one of the requirements of the preferred electrical discharge machining in the present invention. In other words, it was produced not by a negative ion-discharge type of capacitor discharging, which was a requirement for the preferred discharge machining in the present invention, but by pulse discharging.

(Production of Embossing Roller G)

The surface of a heat curing-treated S45C core bar roller 20 cm in diameter and 12 cm in width was hard chrome plated to obtain a hard chrome plated coating 50 µm thick. Then, the roller was subjected to electrical discharge machining under the same conditions as in the case of the embossing roller B, except that the material for the electrode was changed to brass and, instead of the negative ion-discharge type of capacitor discharging, a positive ion-discharge type of capacitor discharging was performed. Thus, an embossing roller G whose rolling surface (embossing form portion) had a concavo-convex pattern with an arithmetic mean roughness (Ra) of 0.8 µm and a mean spacing of profile irregularities (RSm) of 116 µm was obtained. The hardness of the rolling surface was 900 Hv (Vickers hardness). The embossing roller G was so produced as not to meet one of the requirements of the preferred electrical discharge machining in the present invention. In other words, it was produced not by a negative ion-discharge type of capacitor discharging, which was a requirement for the preferred discharge machining in the present invention, but by a positive ion-discharge type of capacitor discharging.

(Production of Embossing Roller H)

The surface of a heat curing-treated S45C core bar roller 20 cm in diameter and 12 cm in width was hard chrome plated to obtain a hard chrome plated coating 50 µm thick. Then, the roller was subjected to electrical discharge machining under the same conditions as in the case of the embossing roller B, except that the material for the electrode was changed to brass and no graphite particles were added to the kerosene working fluid. Thus, an embossing roller H whose rolling surface (embossing form portion) had a concavo-convex pattern with an arithmetic mean roughness (Ra) of 0.4 µm and a mean spacing of profile irregularities (RSm) of 63 µm was obtained. The hardness of the rolling surface was 900 Hv (Vickers hardness). The embossing roller H was so produced as to meet all the requirements of the preferred electrical discharge machining in the present invention except that particles were not added to the working fluid.

(Production of Embossing Roller I)

The surface of a heat curing-treated S45C core bar roller 20 cm in diameter and 12 cm in width was hard chrome plated to obtain a hard chrome plated coating 50 µm thick. Then, the roller was subjected to electrical discharge machining under the same conditions as in the case of the embossing roller B, except that the material for the electrode was changed to brass and the graphite particles 1.5 µm in average diameter were replaced by silicon particles 7 µm in average diameter. Thus, an embossing roller I whose rolling surface (embossing form portion) had a concavo-convex pattern with an arithmetic mean roughness (Ra) of 0.6 µm and a mean spacing of profile irregularities (RSm) of 41 µm was produced. The hardness of the rolling surface was 900 Hv (Vickers hardness). The embossing roller I was so produced as to meet all the requirements of the preferred electrical discharge machining in the present invention.

(Production of Embossing Roller J)

The surface of a heat curing-treated S45C core bar roller 20 cm in diameter and 12 cm in width was hard chrome plated to obtain a hard chrome plated coating 50 µm thick. Then, the roller was subjected to electrical discharge machining under the same conditions as in the case of the embossing roller B, except that the material for the electrode was changed to brass and the voltage applied was decreased to 70V. Thus, an embossing roller J whose rolling surface (embossing form portion) had a concavo-convex pattern with an arithmetic mean roughness (Ra) of 0.1 µm and a mean spacing of profile irregularities (RSm) of 13 µm was obtained. The hardness of the rolling surface was 900 Hv (Vickers hardness). The embossing roller J was so produced as not to meet all the requirements of the preferred electrical discharge machining in the present invention. In other words, it was produced not at a voltage of 100V or more and 400 V or less, which was a requirement for the preferred discharge machining in the present invention, but at a voltage as low as 70 V. Further, it did not meet another requirement of the preferred electrical discharge machining in the present invention. That is, its arithmetic mean roughness (Ra), 0.1 µm, was outside the range of 0.3 µm or more and 1.0 µm or less and its mean spacing of profile irregularities (RSm), 13 µm, was outside the range of 15 µm or more and 150 µm or less.

(Production of Embossing Roller K)

The surface of a heat curing-treated S45C core bar roller 20 cm in diameter and 12 cm in width was hard chrome plated to obtain a hard chrome plated coating 50 µm thick. Then, the roller was subjected to electrical discharge machining under the same conditions as in the case of the embossing roller B, except that the material for the electrode was changed to brass and the voltage applied was decreased to 150V. Thus, an embossing roller K whose rolling surface (embossing form portion) had a concavo-convex pattern with an arithmetic mean roughness (Ra) of 0.3 µm (the lower limit of an arithmetic mean roughness of the present invention) and a mean spacing of profile irregularities (RSm) of 15 µm (the lower limit of the mean spacing of profile irregularities of the present invention) was obtained. The hardness of the rolling surface was 900 Hv (Vickers hardness). The embossing roller K was so produced as to meet all the requirements of the preferred electrical discharge machining in the present invention.

(Production of Embossing Roller L)

The surface of a heat curing-treated S45C core bar roller 20 cm in diameter and 12 cm in width was hard chrome plated to obtain a hard chrome plated coating 50 µm thick. Then, the roller was subjected to electrical discharge machining under the same conditions as in the case of the embossing roller B, except that the material for the electrode was changed to brass, no graphite particles were added to the working fluid and the voltage applied was decreased to 150V. Thus, an embossing roller L whose rolling surface (embossing form portion) had a concavo-convex pattern with an arithmetic mean roughness (Ra) of 1.0 µm and a mean spacing of profile irregularities (RSm) of 150 µm was obtained. The hardness of the rolling surface was 900 Hv (Vickers hardness). The embossing roller L was produced in such a manner as to meet all the requirements of the preferred electrical discharge machining in the present invention, except that particles are not added to the working fluid.

(Production of Embossing Roller M)

The surface of a heat curing-treated S45C core bar roller 20 cm in diameter and 12 cm in width was hard chrome plated to obtain a hard chrome plated coating 50 µm thick. Then, the roller was subjected to electrical discharge machining under the same conditions as in the case of the embossing roller B, except that the material for the electrode was changed to brass, the negative ion-discharge type of capacitor discharging was replaced by a positive ion-discharge type of capacitor discharging and no graphite particles were added to the working fluid. Thus, an embossing roller M whose rolling surface (embossing form portion) had a concavo-convex pattern with an arithmetic mean roughness (Ra) of 1.2 µm and a mean spacing of profile irregularities (RSm) of 150 µm was obtained. The hardness of the rolling surface was 900 Hv (Vickers hardness). The embossing roller M was so produced as not to meet all the requirements of the preferred electrical discharge machining of the present invention. Specifically, it was produced by a positive ion-discharge type of capacitor discharging and adding no graphite particles to the working fluid, and besides, the arithmetic mean roughness (Ra) of its concavo-convex pattern, 1.2 µm, did not meet the upper limit of the range of 0.3 µm or more and 1.0 µm or less of the present invention.

[2] Production of Aluminum Sheets

Rolling (transfer) operations were performed onto aluminum sheets having a composition shown in Table 1 using the above described embossing rollers A to M so as to transfer the concavo-convex pattern of each roller onto the surface of each aluminum sheet. The rolling reduction was 2%.

TABLE 1

| Constituent | Si | Fe | Cu | Mn | Mg | Cr | Zn | Ti | Al |
|---|---|---|---|---|---|---|---|---|---|
| % by mass | 0.073 | 0.27 | 0.1 | 0 | 0 | 0.001 | 0.003 | 0.002 | the rest |

The thickness of the aluminum sheets was 0.3 mm and the arithmetic mean roughness (Ra) and the mean spacing of profile irregularities (RSm) of the same were as shown in Table 2. For the measurement of the surface geometry, a stylus profilemeter (two-dimensional surface roughness tester SJ-400, by MITUTOYO Corporation) was used to measure two-dimensional surface roughness, the arithmetic mean roughness Ra specified in ISO 4287 was determined 5 times, and the mean value of the determined Ra was used as mean roughness Ra. The mean spacing of profile irregularities (the mean spacing in datum length) RSm was determined in the same manner as above.

<Measurement Conditions>

Cutoff length: 0.8 mm, Tilt compensation: ALL, Filter: GAUSS, Scanning speed: 0.1 mm/sec, Probe tip diameter: 2 µm

TABLE 2

| Type of embossing roller | Characteristics of embossing roller | | Ra (µm) of aluminum sheet having undergone transferring |
|---|---|---|---|
| | Ra (µm) | RSm (µm) | |
| A | 0.3 | 69 | 0.2 |
| B | 0.6 | 16 | 0.5 |
| C | 0.4 | 55 | 0.3 |
| D | 0.4 | 50 | 0.3 |
| E | 0.5 | 41 | 0.4 |
| F | 0.3 | 96 | 0.2 |
| G | 0.8 | 116 | 0.7 |
| H | 0.4 | 63 | 0.3 |
| I | 0.6 | 41 | 0.5 |
| J | 0.1 | 13 | 0.1 |
| K | 0.3 | 15 | 0.2 |
| L | 1.0 | 150 | 0.9 |
| M | 1.2 | 150 | 1.0 |

[3] Production of Substrate for Lithographic Plate

Substrates for lithographic plates were produced by subjecting the resultant aluminum sheets to the following treatment.

<Surface Treatment>

(1) Etching Treatment in Alkaline Aqueous Solution

Etching was performed for each of the aluminum sheets by spraying the same with an aqueous solution at 60° C. that contained NaOH and aluminum ions at concentrations of 370 g/L and 100 g/L, respectively. The amount of the aluminum sheet dissolved by the etching treatment was 3 g/m$^2$ on the surface to be electrochemically roughened in the subsequent step. After the etching treatment, each aluminum sheet was drained with nip rollers, rinsed, and again drained with nip rollers. The rinsing was performed first using an apparatus which performed rinsing with free falling curtain-like liquid film, and then with water spouting out in the form of a fan from a spray tip attached to a spray tube for 5 seconds.

(2) Desmutting in Acidic Aqueous Solution

Then, desmutting was performed. This treatment was done using a waste of a nitric acid solution, which was to be used in the electrochemical roughening in the subsequent step. The temperature of the solution was 35° C. The desmut solution was sprayed on each of the aluminum sheets for 5 seconds. After the desmutting, each aluminum sheet did not undergo draining with nip rollers, but underwent handling until the next step while having nitric acid attached on its surface. The handling time, after each aluminum sheet passed through a desmut bath, during which the aluminum sheet had nitric acid attached on its surface was 25 seconds.

(3) Electrochemical Roughening Treatment in Aqueous Solution of Nitric Acid

An electrolytic solution was used which was prepared by adding aluminum nitrate to an 10.4 g/L solution of nitric acid in water at 35° C. and adjusting the aluminum ion concentration to 4.5 g/L.

Before undergoing electrochemical roughening treatment, each of the aluminum sheets was sprayed with an electrolytic solution having the same composition and temperature as those of the nitric acid electrolytic solution used in the electrochemical roughening treatment. Electrochemical roughening treatment was conducted using a power source that generated alternating current. The frequency of the alternating current was 60 Hz and the time Tp the current took to reach a peak from 0 was 1.2 ms. The duty cycle (ta/T) of the alternating current was 0.5. The current density was 60 A/dm$^2$ at the time of anodic reaction of each aluminum sheet when the alternating current is at a peak. The ratio of the total quantity of electricity at the time of anodic reaction of each aluminum sheet to that of electricity at the time of cathodic reaction of the same was 0.95. The quantity of electricity applied to each aluminum sheet was 215 C/dm$^2$ in terms of the total quantity of electricity at the time of anodic reaction of each aluminum sheet.

Figure 5:
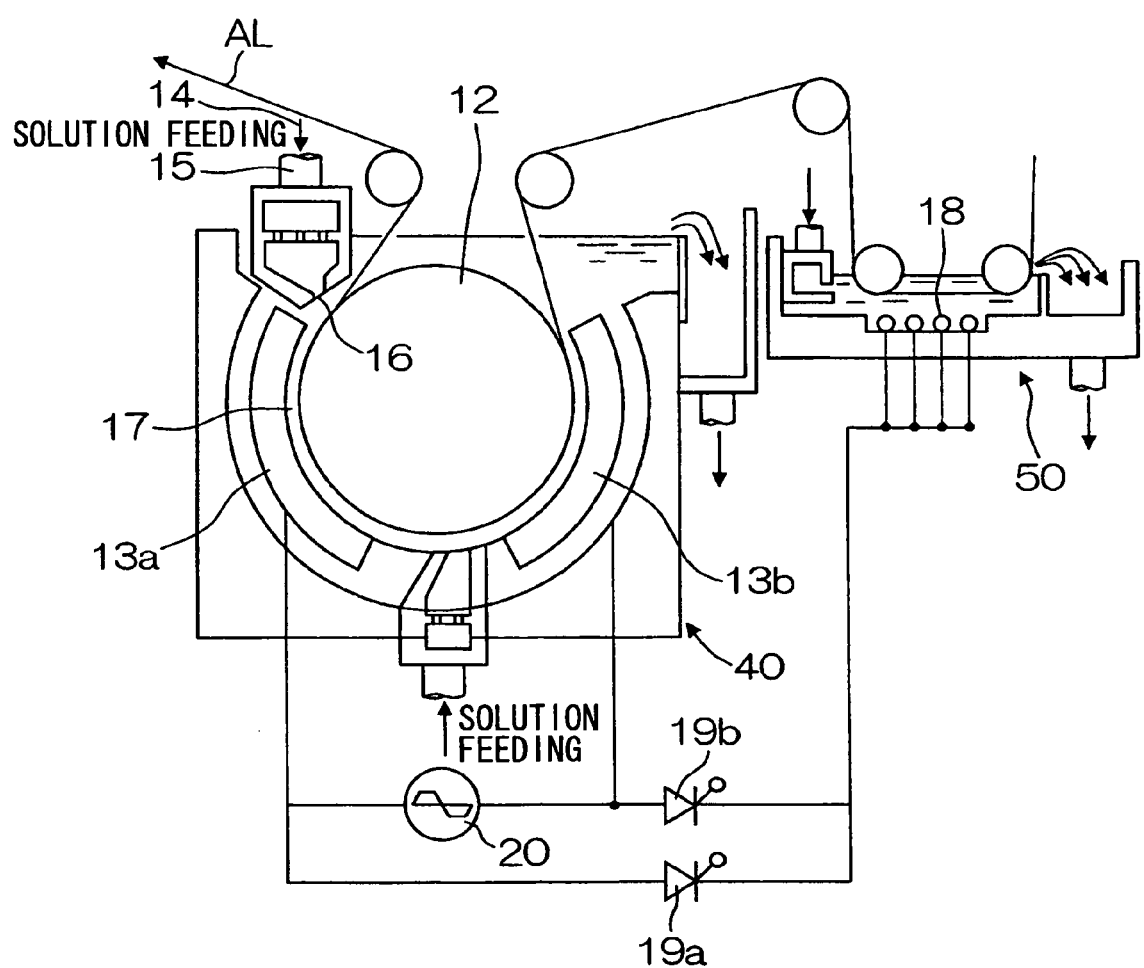
FIG. 5 is a surface view of one example of radial-type cell used in the electrochemical roughening treatment using an alternating current in the method for producing a substrate for a lithographic plate in accordance with the present invention.
Figure 6:
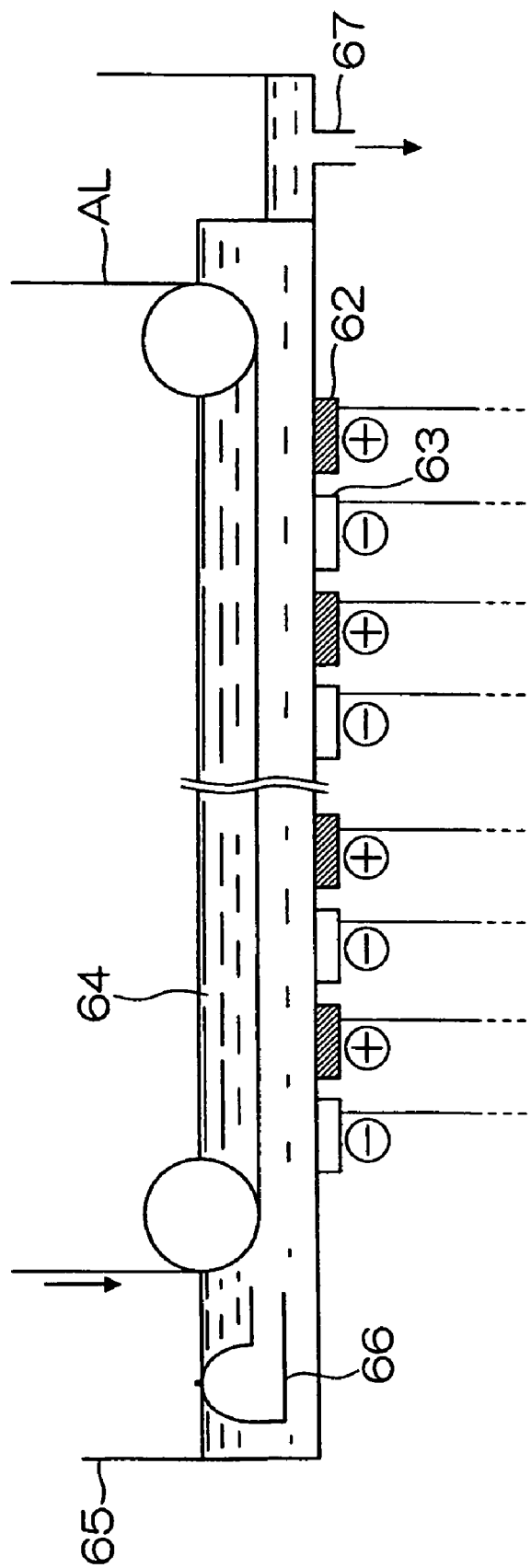
FIG. 6 is a surface view of one example of apparatus used in the electrochemical roughening treatment using a direct current in the method for producing a substrate for a lithographic plate in accordance with the present invention.
Figure 7:
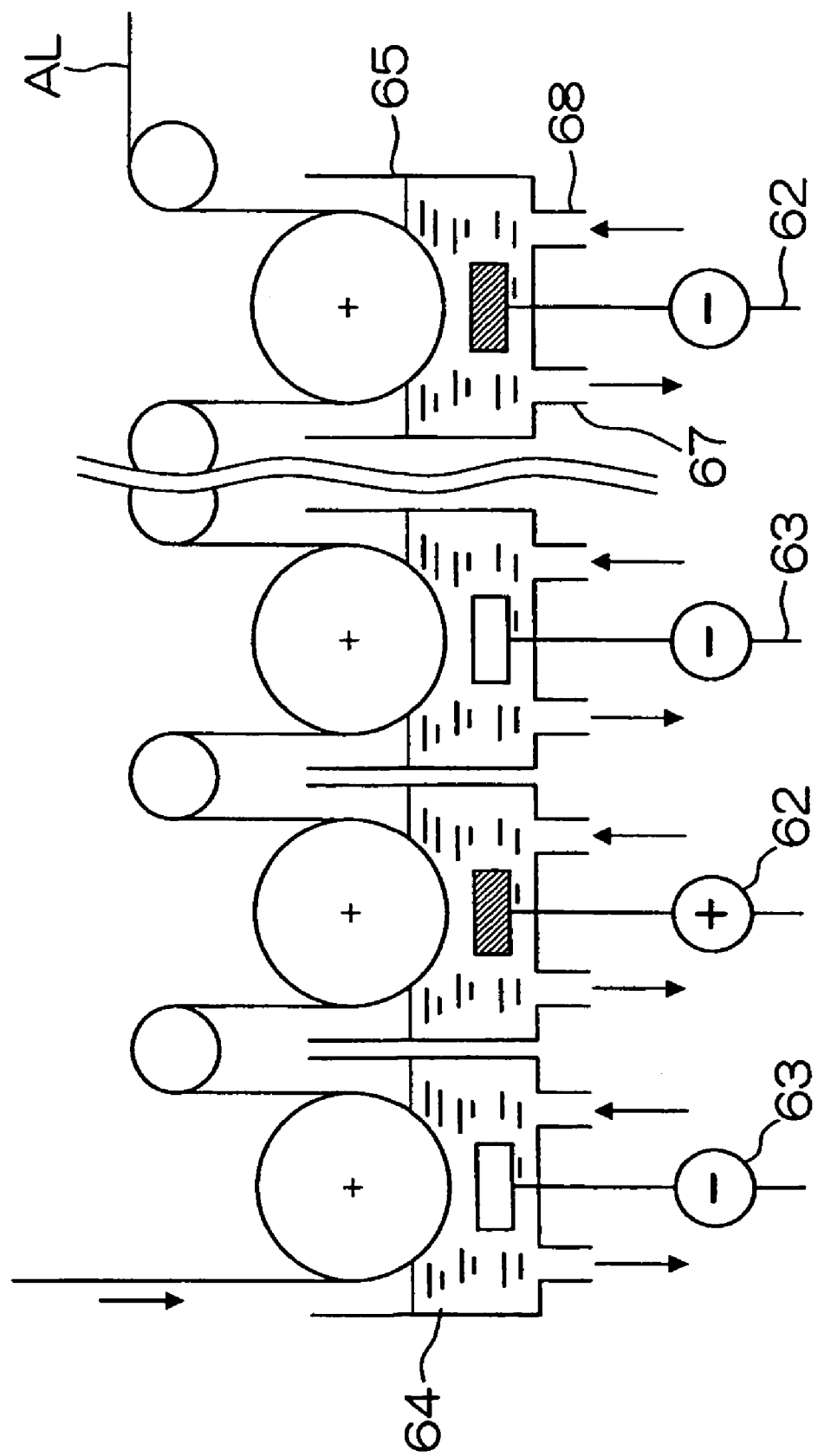
FIG. 7 is a surface view of another example of apparatus used in the electrochemical roughening treatment using a direct current in the method for producing a substrate for a lithographic plate in accordance with the present invention.
Figure 8:
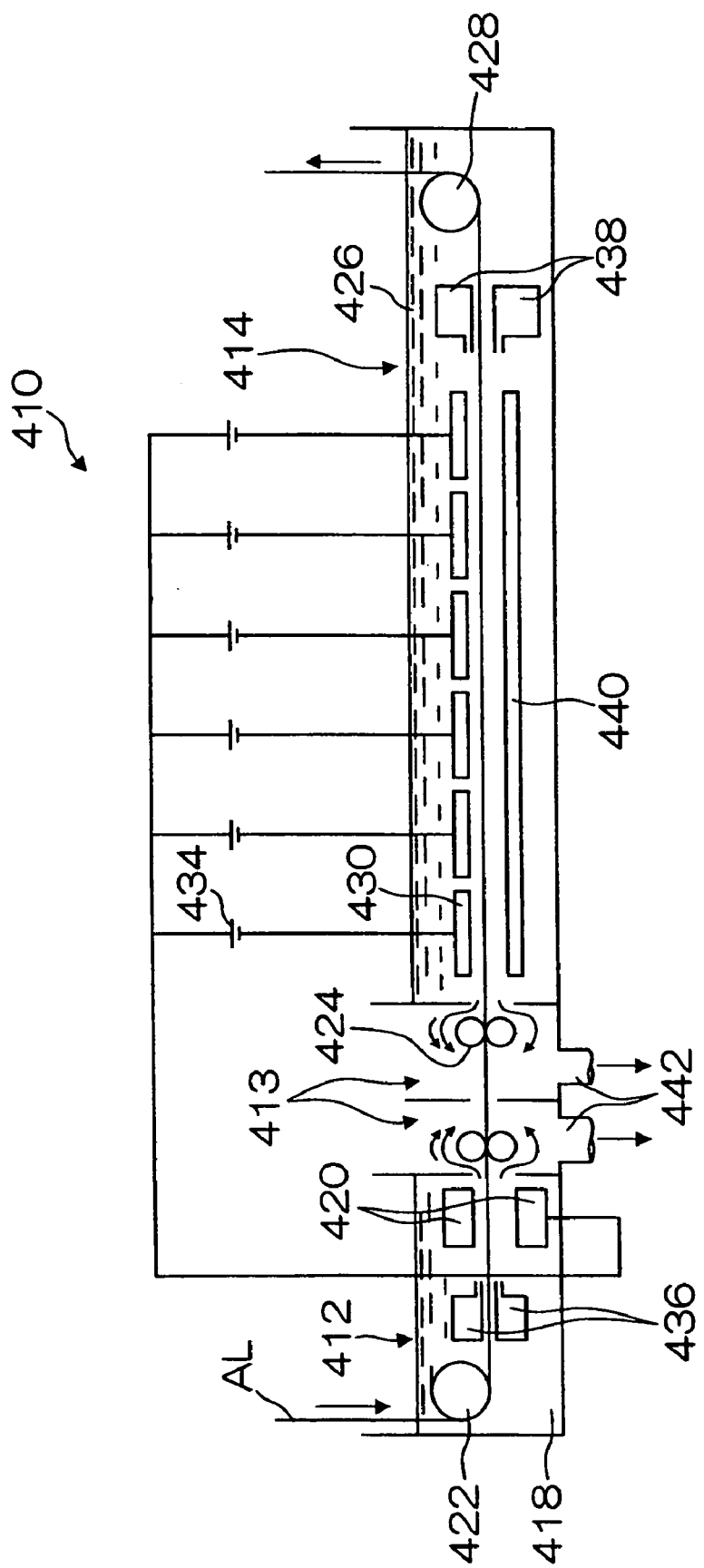
FIG. 8 is a schematic drawing of an anodic oxidation apparatus used in the anodizing in the method for producing a substrate for a lithographic plate in accordance with the present invention.

As electrolytic cells, two radial-type electrolytic cells, as shown in FIG. 5, were used. The relative velocity of each aluminum sheet to the electrolytic solution was 1.5 n/sec (1 to 2 m/sec) in terms of the average in each electrolytic cell.

The aluminum sheets were drained with nip rollers, rinsed, and further rinsed with water spouting out in the form of a fan from a spray tip attached on a spray tube for 5 seconds. The rinsed aluminum sheets were again drained with nip rollers.

(4) Etching Treatment in Alkaline Aqueous Solution

Etching was performed for each of the aluminum sheets for 7 seconds by spraying the same with an aqueous solution at 64° C. that contained NaOH and aluminum ions at concentrations of 370 g/L and 100 g/L, respectively. The amount of the aluminum sheet dissolved by the etching treatment was 3 g/m$^2$ on the surface to be electrochemically roughened in the subsequent step. After the etching treatment, each aluminum sheet was drained with nip rollers, rinsed, and again drained with nip rollers. The rinsing was performed first using an apparatus which performed rinsing with free falling curtain-like liquid film, and then with water spouting out in the form of a fan from a spray tip attached to a spray tube for 5 seconds.

(5) Desmutting in Acidic Aqueous Solution

Then, desmutting was performed. This treatment was done using a solution prepared by dissolving aluminum ion in a 300 g/L solution of sulfuric acid in water so that the aluminum ion concentration became 2 g/L. The temperature of the solution was 35° C. and the treatment time was 10 seconds. After the treatment, each aluminum sheet was drained with nip rollers, rinsed with water spouting out in the form of a fan from a spray tip attached to a spray tube for 5 seconds, and lastly drained with nip rollers.

(6) Electrochemical Roughening Treatment in Aqueous Solution of Hydrochloric Acid An electrolytic solution was used which was prepared by adding aluminum chloride to a 5 g/L solution of hydrochloric acid in water at 35° C. and adjusting the aluminum ion concentration to 5 g/L. Electrochemical roughening treatment was conducted using a power source that generated trapezoidal shape alternating current. The frequency of the alternating current was 60 Hz and the time Tp the current took to reach a peak from 0 was 0.8 msec. The duty (ta/T) of the alternating current was 0.5. The current density was 50 A/dm$^2$ at the time of anodic reaction of each aluminum sheet when the alternating current is at a peak. The ratio of the total quantity of electricity at the time of anodic reaction of each aluminum sheet to that of electricity at the time of cathodic reaction of the same was 0.95. The quantity of electricity applied to each aluminum sheet was 65 C/dm$^2$ in terms of the total quantity of electricity at the time of anodic reaction of each aluminum sheet.

As an electrolytic cell, a radial-type electrolytic cell, as shown in FIG. 5, was used.

The relative velocity of each aluminum sheet to the electrolytic solution was 1.5 m/sec in terms of the average in each electrolytic cell. The aluminum sheets were drained with nip rollers, rinsed, and again drained with nip rollers.

(7) Etching Treatment in Alkaline Aqueous Solution

Etching was performed for each of the aluminum sheets by spraying the same with an aqueous solution at 35° C. that contained NaOH and aluminum ions at concentrations of 50 g/L and 5 g/L, respectively so that 0.2 g/m$^2$ of each aluminum sheet was dissolved. After the etching treatment, each aluminum sheet was drained with nip rollers, rinsed, and again drained with nip rollers. The rinsing was performed first using an apparatus which performed rinsing with free falling curtain-like liquid film, and then with water spouting out in the form of a fan from a spray tip attached to a spray tube for 5 seconds. Furthermore the aluminum sheet was drained with nip rollers.

(8) Desmutting in Acidic Aqueous Solution

Then, desmutting was performed. This treatment was done using a waste (a 5 g/L solution of aluminum ion in a 170 g/L solution of sulfuric acid in water) produced in the subsequent anodizing step as an acidic aqueous solution used for the desmutting. The temperature of the solution was 35° C. and the treatment time was 5 seconds. After the treatment, each aluminum sheet was drained with nip rollers. Rinsing was not performed after the draining until the subsequent anodizing.

(9) Anodizing

Then, anodizing was performed under the following conditions for each of the aluminum sheets having undergone the above desmutting. First, an electrolytic solution was prepared by adding aluminum sulfate to a 170 g/L solution of sulfuric acid in water and adjusting the aluminum ion concentration to 5 g/L. Then, a 2.4 g/m$^2$ of direct current anodic oxidation film was provided for each aluminum sheet using the above electrolytic solution under such conditions that allow the current density applied to each aluminum sheet in the electrolytic cell to be 15 A/dm$^2$ in terms of average current density during the anodic reaction of the aluminum sheet.

(10) Hydrophilization Treatment

Hydrophilization treatment was performed in which each of the aluminum sheets having undergone the above anodizing was dipped in an 1.0% by mass solution of sodium silicate in water at 20° C. for 10 seconds. The amount of Si on the surface of each aluminum sheet measured with a fluorescent X-ray analyzer was 3.5 mg/m². Then, each aluminum sheet was drained with nip rollers, rinsed, and again drained with nip rollers. And air at 90° C. was blown on each of the drained aluminum sheets for 10 seconds to dry the same.

The surface geometry of each of the aluminum sheets was observed at ×50000 magnification with a scanning electron microscope. The observation confirmed that concaves or convexes as minute as 0.1 µm in diameter were uniformly and closely formed on the surface. Further, the observation at ×2000 magnification with a scanning electron microscope confirmed that concaves or convexes 1 to 5 µm in diameter were formed on the surface of each aluminum sheet. The minute concaves or convexes 0.1 µm in diameter were formed in such a manner as to be superposed on the concaves or convexes 1 to 5 µm in diameter.

[4] Production of Lithographic Plates

Each of the substrates for lithographic plates obtained as above was coated with a thermal-positive-type imaging layer and dried in a manner described below so as to produce lithographic plate samples 1 to 13.

Each of the substrates for lithographic plates was coated with a primer having a composition described below and dried at 80° C. for 15 seconds to form a coating film of primer coat. The amount of the coating film after drying was 15 mg/m².

<Composition of Primer>
polymer below . . . 0.3 g
methanol . . . 100 g
water . . . 1 g

[Chemical Formula 1]

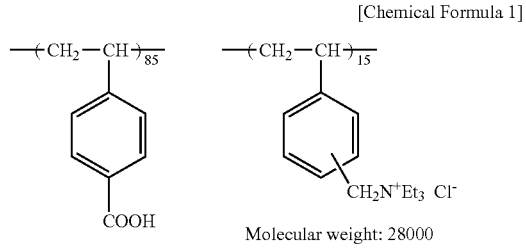

Molecular weight: 28000

Further, a coating solution for thermosensitive layer having a composition described below was prepared, and each of the substrates for lithographic plates on which primer coat had been provided was coated with the coating solution for thermosensitive layer so that the amount of the coating solution for thermosensitive layer after drying (the amount of coating for thermosensitive layer) was 1.8 g/m². Then, the coating solution was dried to form a thermosensitive layer (thermal-positive-type imaging layer), whereby lithographic plates were obtained.

<Composition of Coating Solution for Thermosensitive Layer>
novolak resin (m-cresol/p-cresol=60/40, weight average molecular weight: 7,000, containing 0.5% by mass unreacted cresol) . . . 0.90 g
ethyl methacrylate/isobutyl methacrylate/methacrylic acid copolymer (molar ratio: 35/35/30) . . . 0.10 g
cyanine dye A expressed by the chemical structural formula 2 below . . . 0.1 g
tetrahydrophthalic anhydride . . . 0.05 g
p-toluenesulfonic acid . . . 0.002 g
ethyl violet counter ion in the form of 6-hydroxy-β-naphthalenesulfonic acid . . . 0.02 g
fluorosurfactant (Defensor F-780F, by DAINIPPON INK AND CHEMICALS INCORPORATION, solid content: 30% by mass) . . . 0.0045 g (in terms of solid content)
fluorosurfactant (Defensor F-781F, by DAINIPPON INK AND CHEMICALS INCORPORATION, solid content: 100% by mass) . . . 0.035 g
methyl ethyl ketone . . . 12 g

[Chemical Formula 2]

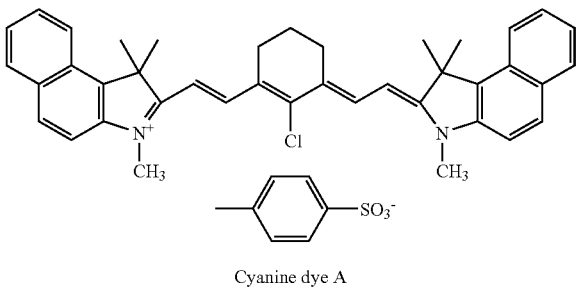

Cyanine dye A

[5] Evaluation of Lithographic Plates

Printing characteristics such as plate wear, sensitivity and resistance to stains were evaluated for the lithographic plate samples 1 to 13 produced as above by the methods described below.

(1) Plate Wear (Number of Printed Copies)

Images were written on each of the lithographic plates using TrendSetter by Creo Inc. at a drum revolution speed of 150 rpm and a beam intensity of 10 W. Then, each of the above lithographic plates was developed with a PS processor 940H by FUJI PHOTO FILM Co., Ltd., into which alkaline developer solution having a composition described below had been fed, over 20 seconds while keeping the developer solution at 30° C. to obtain lithographic plates.

<Composition of Alkaline Developer Solution B>
D-sorbitol . . . 2.5% by mass
sodium hydroxide . . . 0.85% by mass
polyethylene glycol lauryl ether (weight average molecular weight: 1000) . . . 0.5% by mass
water . . . 96.15% by mass The images on the resultant lithographic plates were printed on a LITHRONE printer by KOMORI Corporation using black ink DIC-GEOS (N) by DAINIPPON INK AND CHEMICALS, Inc. The plate wear was evaluated by the number of printed copies at the time the decrease in the density of the solid image was observed visually, and the evaluations were divided into 4 ranks: ⊙, ○, Δ, X.

⊙: The number of printed copies is 40,000 or more.

○: The number of printed copies is 30,000 or more and less than 40,000.

Δ: The number of printed copies is 20,000 or more and less than 30,000.

X: The number of printed copies is less than 20,000

(2) Sensitivity

Each of the lithographic plates was imagewise exposed to light using TrendSetter 3244 equipped with a semiconductor laser of output 500 W, wavelength 830 nm and beam diameter 17 μm ($1/e^2$) by Creo Inc. at a fast scan speed of 5 m/sec and an energy exposed to the plate surface of 140 mJ/cm$^2$. To evaluate the sensitivity, samples were prepared which were exposed to light while varying an energy exposed to the plate surface from 45 mJ/cm$^2$ to 180 mJ/cm$^2$ in 5 mJ/cm$^2$ increments.

Development was performed at a developing temperature of 25° C. for 12 seconds using an automated developing machine, PS900NP (FUJI PHOTO FILM Co., Ltd.), having a developing solution B of the above composition filled thereinto. After completing the development, the lithographic plates were rinsed and treated with gum (GU-7 (1:1)) etc. to obtain finished lithographic plates. The minimum exposure amount at which images were formed after development was determined for each of the samples with different an energy exposed to the plate surface and the determined value was used as sensitivity. The smaller plate surface energy indicates the better sensitivity. The evaluations were divided into 4 ranks: ⊚, ○, Δ, X based on an energy exposed to the plate surface.

⊚: The energy quantity is less than 50 mJ/cm.

○: The energy quantity is less than 100 mJ/cm$^2$ and 50 mJ/cm$^2$ or more.

Δ: The energy quantity is less than 150 mJ/cm$^2$ and 100 mJ/cm$^2$ or more.

X: The energy quantity is 150 mJ/cm$^2$ or more.

(3) Resistance to Stains

Printing was performed on lithographic plates obtained in the same manner as those used in the evaluation of plate wear on a printing machine, MITSUBISHI DIA F2 (Mitsubishi Heavy Industries Ltd.) using DIC-GEOS (s) red ink. The stains on the rubber blanket were visually evaluated after printing 10000 copies. The evaluations were divided into 3 ranks: A, B and C depending on the degree of the stains.

A: The blanket is hardly stained.

B: The blanket is a little stained.

B–C: The blanket is stained, but the stains are within the acceptable range.

C: The blanket is stained and the printed output is also stained obviously.

(4) Service Life of the Roller of Embossing Roller

Embossing was performed on an aluminum sheet 10 cm wide and 100 m long using an embossing roller (embossing form) 12 cm wide. Then, the flaws or wear on the portions brought into contact with the edges of the aluminum sheet (the portions 1 cm inside the roller width) was checked and evaluated visually. The evaluations were divided into 3 ranks: A, B and C as follows.

A: No flaws are observed.

B: Flaws are slightly observed.

C: Wear is obvious.

The evaluations made as above are shown in Table 3.

TABLE 3

| | | Evaluation of lithographic plate | | | | |
|---|---|---|---|---|---|---|
| Sample No. | Embossing form type | Service life of roller | Sensitivity | Plate wear | Resistance to stains | Remarks |
| 1 | A | C | ○ | Δ | A | Surface hardness was 300 Hv. |
| 2 | B | A | ○ | ⊚ | A | All the requirements were met. |
| 3 | C | B | ○ | ○ | A | All the requirements were met. |
| 4 | D | A | ○ | ○ | A | All the requirements were met. |
| 5 | E | A | ○ | ⊚ | A | All the requirements were met. |
| 6 | F | A | ○ | Δ | A | Pulse discharge was used. |
| 7 | G | A | ○ | X | A | Positive discharge was used. |
| 8 | H | A | Δ | ○ | A | All the requirements were met, except that no fine particles were added. |
| 9 | I | A | ○ | ⊚ | A | All the requirements were met. |
| 10 | J | A | ○ | X | A | Ra: 0.1 μm, RSm: 13 μm |
| 11 | K | A | ○ | ⊚ | A | All the requirements were met. |
| 12 | L | A | Δ | ○ | A | All the requirements were met, except that no fine particles were added. |
| 13 | M | A | X | X | B | Ra: 1.2 μm. Positive discharge was used. |

As is apparent from Table 3, the samples 2 to 5, 9 an 11, which were produced using an aluminum sheet on which a concavo-convex pattern had been transferred with an embossing roller prepared in such a manner as to meet all the requirements for the electrical discharge machining of the present invention, were excellent in sensitivity, plate wear and resistance to stains, which are important characteristics of lithographic plates, and beside the service life of their roll having undergone emboss transferring was also good. The samples 8 and 12, which were produced using an aluminum sheet on which a concavo-convex pattern had been transferred with an embossing roller prepared in a such a manner as to meet all the requirements except that no fine particles were added, were acceptable ones, though their sensitivity was a little inferior to that of the samples which were produced using an aluminum sheet surface textured in such a manner as to meet all the requirements for electrical discharge machining.

On the other hand, samples 1, 6, 7, 10 and 13, which were produced using an aluminum sheet surface textured in such a manner as not to meet any one or more of the requirements for electrical discharge machining of the present invention: Ra, RSm, surface hardness and discharge type, were not acceptable ones as high-quality lithographic plates, because they were poor in sensitivity or lacking in plate wear. And in the embossing roller A whose rolling surface did not have sufficient hardness, the service life was short.

What is claimed is:

1. A method for providing surface texturing of an aluminum sheet by using a surface-texturing device comprising an embossing form and transferring a concavo-convex pattern of the embossing form to at least one surface of the aluminum sheet,
- wherein the concavo-convex pattern of the embossing form to be transferred to the aluminum sheet is formed by electrical discharge machining,
- wherein the aluminum sheet is an aluminum sheet used for producing a substrate for a lithographic plate, and
- wherein the concavo-convex pattern on the embossing form to be transferred to the aluminum sheet has an arithmetic mean roughness Ra of 0.3 µm or more and 1.0 µm or less and a mean spacing of profile irregularities RSm of 15 µm or more and 150 µm or less.

2. The method for providing surface texturing of an aluminum sheet according to claim 1,
- wherein the electrical discharge machining is a negative-ion discharge type of electrical discharge machining where a working fluid contains kerosene and a material containing copper or brass is used as a discharge electrode,
- wherein an applied voltage is 100 V or more and 400 V or less.

3. The method for providing surface texturing of an aluminum sheet according to claim 1, wherein the working fluid contains fine particles having an average particle size of 1 µm or more and 10 µm or less in an amount ranging from 1 g/liter or more to 20 g/liter or less and the fine particles comprises particles of at least one selected from the group consisting of graphite, silicon and molybdenum sulfide.

4. The method for providing surface texturing of an aluminum sheet according to claim 1, wherein the Vickers hardness of the material constituting the embossing form is 500 Hv or more and 1500 Hv or less and
- wherein the material constituting the embossing form is coated with any one plating selected from the group consisting of:
- hard chrome plating;
- nickel plating that contains phosphorous or both phosphorous and boron; and
- chrome or nickel plating that can codeposit particles of at least one kind of compound selected from the group consisting of titanium carbide (Tic), tungsten carbide (WC), silicon carbide (SiC), boron carbide ($B_4C$) and titanium boride ($TiB_2$).

5. The method for providing surface texturing of an aluminum sheet according to claim 4, wherein the plated layer formed by applying the plating undergoes heat curing treatment at 300° C. or higher and 1000° C. or lower at least for 1 hour.

6. The method for providing surface texturing of an aluminum sheet according to claim 4, wherein the surface-texturing device comprising an embossing form is an embossing roller whose circumference has the concavo-convex pattern formed on its surface, the embossing roller being used for cold rolling the aluminum sheet so as to transfer the concavo-convex pattern to the aluminum sheet, and
- wherein the rolling reduction at the time of the cold rolling is 0.5 to 20%.

* * * * *